United States Patent [19]
Henwood

[11] Patent Number: 5,941,266
[45] Date of Patent: *Aug. 24, 1999

[54] ANGLE ENTRY ROTARY VALVE

[75] Inventor: Gerard S. Henwood, Glen Mills, Pa.

[73] Assignee: Newport Technologies Holdings, Inc., Glen Mills, Pa.

[*] Notice: This patent is subject to a terminal disclaimer.

[21] Appl. No.: 08/875,853

[22] PCT Filed: Feb. 6, 1996

[86] PCT No.: PCT/US96/01576

§ 371 Date: Aug. 6, 1997

§ 102(e) Date: Aug. 6, 1997

[87] PCT Pub. No.: WO96/25614

PCT Pub. Date: Aug. 22, 1996

Related U.S. Application Data

[63] Continuation-in-part of application No. 08/384,577, Feb. 6, 1995, Pat. No. 5,562,116.

[51] Int. Cl.$^6$ ............... F16K 43/00; F16K 5/06
[52] U.S. Cl. ............ 137/15; 29/213.1; 137/315; 251/305; 251/306; 251/315.14; 251/315.16; 251/316; 251/317; 251/357; 251/360; 251/363
[58] Field of Search ................ 137/15, 315, 454.2, 137/454.5, 454.6; 29/213.1, 402.02, 402.03, 402.08, 890.121; 251/305, 306, 307, 309, 310, 315.1, 315.11, 315.14, 315.16, 316, 317, 357, 360, 363

[56] References Cited

U.S. PATENT DOCUMENTS

| | | | |
|---|---|---|---|
| 3,474,818 | 10/1969 | Hartman | 137/315 |
| 3,697,043 | 10/1972 | Baker | 251/315.1 |
| 3,949,965 | 4/1976 | Sharples et al. | 251/315.1 |
| 4,027,698 | 6/1977 | Weinhold | 251/315.16 |
| 4,273,152 | 6/1981 | Freeman | 137/315 |
| 4,307,747 | 12/1981 | Carpentier | 137/315 |
| 4,508,139 | 4/1985 | Teumer | 137/315 |

*Primary Examiner*—George L. Walton
*Attorney, Agent, or Firm*—Robert S. Lipton, Esq.; Lipton, Weinberger & Husick

[57] ABSTRACT

Straight line flow rotary valves with the valve member flow passage (21) turned away from the pipeline flow axis (22), to dispose the valve internals to an access port (50) located downstream on the same flow axis of the valve member (11). Another embodiment is used in place of pipe elbows where the rotary valve internals are accessed through a port (50) on the same flow axis (22) as the upstream pipe. In both valve body embodiments, the flow is turned again, downstream of the valve member (11), to communicate with the connecting downstream piping which, in the first embodiment is along the same axis as the upstream pipe (22), and in the second embodiment, is on a different axis (39), and, is generally 45 or 90 degrees turned from the upstream pipe.

In both embodiments the flow turns in a component (12) installed, through the body access port (50). In all embodiments the turning component also services as the pressure boundary access cover over the body opening (50). In a variety of embodiments the turning component (12) additionally services as the valve seat (13), and as a behind the seat seal (16).

Sealing member embodiments include floating and trunnion-mounted ball and partial ball valves, and butterfly valves. The preferred embodiment of butterfly valve has a removable resilient seal material (71) such as PTFE or a graphite-based laminate, retained to the valve disc member (11) to facilitate complete repair of all flow isolation surfaces without having to remove the disc member from the valve through the access port (50).

Method for removing and installing valve internals through the access port is disclosed.

53 Claims, 15 Drawing Sheets

ANGLE ENTRY ROTARY VALVE

This is a continuation-in-part application of U.S. patent application Ser. No. 08/384,577 filed Feb. 6, 1995 by the Applicant, now U.S. Pat. No. 5,562,116, issued Oct. 8, 1996.

TECHNICAL FIELD

This invention relates to valves, specifically to industrial and commercial ball and butterfly valves used to isolate and control flow in equipment and piping.

BACKGROUND ART

In industrial plants, valves are repaired frequently. Valves which are welded into the pipe are usually repaired in place due to the expense related to removal and reinstallation. Linear acting valves of the gate and globe style have a bonnet, which when removed, gives access to the internal parts of the valve. Valves which have flanged or clamped pipe connections can be either repaired in place or removed to a shop for repair. Shop repair is preferred, when feasible, due to the ability to shop test valves after the seat and sealing members have been restored. Also, a shop is a more ideal working environment compared to an insitu job and repair quality is generally better.

A problem arises with split body or side entry ball and butterfly (rotary) valves when repairs are necessary and the valves are welded in line, or flanged (or clamped) but not feasible to remove due to space restrictions, or a limited available repair time. Valves of this type do not have a bonnet which can be removed to access the valve internals.

If a split body valve is welded into the line, the line must be cut so that the body bolts can be removed to access the internal valve member. Cutting a pipeline is very costly. After lines greater than 2½" are cut the pipe ends and the valve ends have to be machined to achieve the beveled butt weld end dimension in accordance with American National Standard Institute B16.25. Then after the valve has been repaired it must be rewelded back into the flowline. Finally, depending on the nature of the valve installation, non-destructive testing, ranging from dye checking to full penetration x-ray is done. Removal and reinstallation costs often are the most expensive step in the repair of a welded in split body or end entry valve.

Some manufacturers of split body valves will suggest removing the body bolts and pulling the valve apart. The problems with this method are many. The piping to which the valve is attached, cannot be sprung apart without placing undesirable stresses in the piping. These stresses can become the root cause of future pipe rupture, which can be catastrophic in high pressure or hazardous medium situations. Furthermore, even after using the heavy duty slings and come-alongs to spread the valve apart, there is usually not enough space between the two sections of the split body to properly remove and reinstall the internals, and, misaligned trim (internals) is often the result. Lastly, but not least, this method can also be very dangerous as there is a risk of the sprung pipe letting go or moving. If this were to happen while repair personnel were working in the valve, that part of the mechanic's body (head, hands, arms, etc.) which is between the two valve body sections could be crushed.

Two of the three primary types of industrial service rotary valves have inline repairable (bonneted) designs. They are top entry (spherical plug) ball valves and plug (tapered and straight cylinder) valves. The other rotary valve widely used in the industrial/commercial environment is the butterfly valve. Butterfly valves are made in a side entry design, and therefore are not inline repairable. To repair a butterfly valve at least one valve pipe connection must be opened. It suffers from the same problems that a split body or side entry ball valve does when it comes to insitu repair. Tapered plug valves, due to their requirement to have linear seating force (gravity and/or often some mechanical assist) are generally always top or bottom entry. While the technology described in this patent is presently indicative of that found in the spherical, near spherical or partially spherical plug (ball) and the butterfly valve, it is not intended to exclude its application to plug valve art.

Several types of top entry, inline repairable ball valves have been proposed—for example, in the U.S. Pat. Nos. 2,998,223 to Baxter (1961), 4,562,860 to Walter, Costa, and Eminger (1986), 4,637,421 to Stunkard (1986), 4,718,444 to Boelte (1988), 3,154,094 and 3,179,121 to Bredtschneider et al. (1961). All of these patents were issued for resilient seated valves with a service limitation of about 450 degrees Fahrenheit. Resilient seats, often made of Teflon brand PTFE (polymer) a trademark of E.I. duPont de Nemours & Company, Wilmington, Del., USA, can be forced into a confined ball and seat ring(s) cavity from the top down as is done in a top entry ball valve. It is important to note that this forcing of the valve trim often results in damaged balls and soft seat rings rendering the valve useless as a positive isolation device. Changing the soft seats out of a top entry ball valve is likened to changing a bicycle tire. There is a lot of prying and pinching and often the resilient seat material, like the tire inner tube, gets punctured. The difference between the tire and the valve seals is that a tire can be patched while the valve seals, once damaged by a screw-driver or any other prying instrument, are scrap. For this reason, the easy assembly of the split and side entry body is widely used. A means by which resilient seats could be installed, while the valve is completely connected to the pipe, and at the same time minimizing the risk of damaging them in the process, would advance the art.

The problems found with installing valve components in a top entry soft seated valve are compounded in a metal seated valve, as there is much less compressibility in the metal internals as they are forced into the valve, compared to the soft, low friction surface of resilient seat material. Ironically, it is with metal seated valves that some type of valve internal access is vital to the long term user acceptance as valves of this type are, due to severe service conditions, more inclined to be welded in place, especially in power plant environments.

Many high temperature ball valves are of the floating ball design. With this design the ball is suspended between a belleville spring loaded upstream guide and the downstream valve seat. Both the upstream guide and the valve seat are radiused to mate with the spherical shape of the ball. The spring is essential to the accommodation of thermally induced movement of the valve components which occurs in high temperatures services. The spring loads are best applied by a compression of the seat/ball/upstream guide and belleville spring along the flow axis of the valve. Use of the split body or side entry enables a loading force to be applied against the guide spring as torque is being applied to the fasteners that join the valve body parts together.

(a) U.S. Pat. No. 5,313,976 to Beasley (1994) discloses a top entry floating ball design valve. Using a smooth planar wall surface and a special square belleville, this design is an attempt to solve the problem of assembling a valve with a spring loaded guides from the top down. With this design the downward force (perpendicular to the flowline axis) needed to urge the square spring into the narrow gap between the body wall and the upstream ball guide can compromise alignment by cocking the guide and ball components. Also, this design may work at the first factory assembly, however, once a valve has been in service the smoother planar wall will no longer be smooth and will require restoration to render it useful each time the valve is repaired. Field machining the planar wall will be very difficult because special tooling may be required to true up the bottom corners of the square area.

(b) Furthermore, planar wall restoration will result in the need for thicker (oversized) belleville spring to make up for the material lost to a grinding and/or machining operation. This problem becomes especially apparent when the ball and seat required a substantial surface repair in way of machining, grinding and lapping, further reducing the compression value of the guide spring. It then becomes a maintenance problem having to order a special spring when the valve is repaired, especially since the size of the spring may not be known until the smoothing out of the planar wall (and member seat) is finished. By this time it may be too late to purchase a specialized spring due to factory lead times. Reusing the old belleville with a diminished critical ball loading dimension can result in valve seat failure, and, a lock-up condition wherein the ball drops and becomes seized and inoperable.

(c) Lastly, in regards to the Beasley design, in an attempt to make the insertion of the square belleville easier its strength can be compromised due to size reduction. This can result in premature spring failure and the same problems as with undersized springs as indicated above.

Now that ball valves are being used as flow control valves in high pressure and temperature service it is important to have a valve body design that permits nondestructive access to the internal members. Control valves, especially those involved with severe pressure breakdown in the order of thousands of pounds per square inch, experience accelerated wear. Therefore inspection and repair are done frequently.

(d) U.S. Pat. No. 5,305,986 to Hunt (1994) discloses a split body (floating) ball valve which due to its high temperature and pressure capability, is very likely to be welded into the pipeline. Being a split body valve presents a major drawback to this design since every time the valve is in need of inspection and repair the line must be cut and rewelded. Being able to effectively spring load the guide and yet have easy access to the inner workings of this valve would be a significant improvement of this design.

(e) With respect to non-rotary valve prior art, there are hundreds of patents which disclose various designs of gate and globe valves for use in industrial plant services. In high pressure and temperature applications, such as those existing in power plants, the gate and globe valve seats are permanently attached to the valve body. Therefore, seat grinding, machining and very often, minor and major weld repairs, must take place at the valve location, as most power plant feed water and steam valves are welded in the line. Not being able to remove the valve to a shop means that specialized portable tools must be brought to the site. This tooling, besides being expensive to make, purchase, or difficult to schedule when rented (with or without an engineer/technician), is often very difficult to setup, and, does not usually bring the same surface finish results as does a machine shape with heavier, stationary lathes, boring mills, etc. Undesirable machine tool surface chattering is a field problem encountered when using lighter weight portable machines to cut very hard metallic valve seats.

(f) Furthermore, there are many industrial repair situations where it is unsafe to expose workers to the area immediately surrounding a valve. Nuclear plant valves are a good example of this. When extensive valve seat repairs are necessary it is not unusual to use up several technicians' radiation exposure allowances. Hazardous chemical environments are another example of this.

(g) Also, as is often the case with smaller (3 inch and under) high pressure (ANSI Class 1500, 2500 and 4500) gate and globe valves, once the valve seat is damaged and repaired to a point where the seating material is gone, the valve, which is in otherwise good condition is cut out of the line and discarded.

(h) Flanged end joints are often the preferred design for valves where, due to a split body, end entry (rotary valves) or low pressure service (gate and globe valves) the valves are removed from the pipe for maintenance. Collectively, flanged end valves present a serious environmental problem due to the known leak rate of this connection method. The Clean Air Act is guiding industrial plants to ways to reduce harmful fugitive emissions.

(i) In addition to concerns about fugitive emissions and worker safety in the chemical industry, many industrial plants would prefer to weld valves in line, rather than flange them, if there was a way to easily perform repairs without having to remove complete valves from the line. Removal and reinstallation cost of flanged valves is a very costly part of the repair process.

The primary purpose of the valve of the present invention is to permit field disassembly and assembly without having to cut, spring or unbolt a rotary valve from the line to which it is connected. The further advantage is that the environmental leakage and fire hazard that occurs at valve-to-pipe joints can be eliminated by making a valve integral with the pipe, mainly by way of welding. Rotary valves are best assembled by stacking the internal parts along the axis of flow. To achieve this optimum assembly once the valve is installed requires the removal of the valve or the use of a flowpath that is turned enough away from the direction of flow at the valve inlet so as to dispose a flow axis to an opening which will facilitate flow axis parts installation. This turning of a rotary valve's flowpath (at the expense of flow capacity) to simplify field repair is the essence of the AERo valve.

As explained previously, flow turns within an AERo valve can take place in the body inlet and outlet flow chambers and in a removable component called the DVC (downstream valve component). Embodiments are shown herein in which the flow is turned within the valve member rather than the DVC. Embodiments described hereinafter as "flow turning embodiments" comprise a combination of the DVC and valve member functions into a unitary member.

In addition, an embodiment called the "compression plate retainer", will also be described.

OBJECTS AND ADVANTAGES

The primary object of this invention is to improve upon the superior assembly method and very tight shut-off capabilities of split body and side entry rotary valves by making them field repairable without having to open pipe connections. Accordingly, there are several related objects and advantages of present invention as follows:

(a) to provide a valve design that now can be welded into the pipeline and becomes an integral part of the line, as opposed to flanged or clamped, thereby eliminating the possibility of flange seal failure. This will greatly increase industrial plant safety, (especially where dangerous medium is flowing in the line) save maintenance dollars, and, reduce the amount of environmentally harmful fugitive emissions, which occur due to bolted flange leaks.

(b) to provide a welded inline high pressure ball valve and, butterfly valves, with not only a readily removable disc or ball closing member, but one, whereby the valve seat is actually removed before the closing member.

(c) to provide unprecedented repair capability to the high pressure ball valve and butterfly valves whereby, due to the removable seats, seat restoration procedures (which generally are the most time consuming part of a valve repair) like rough machining, welding, postweld heat treatment, post weld machining, grinding and lapping can all take place in a shop rather than in the plant or field. Being able to perform these labor intensive procedures in a shop will promote general safety in the work place, better repair quality, and faster repair turnaround without the need for specialized portable machine tools.

(d) to provide the inline removable seats in the ball and butterfly valves as a means to reduce the amount of time spent in:
  1.) a radioactive atmosphere such as can occur in nuclear plants
  2.) areas of an industrial plant where hazardous or lethal chemicals are part of the process.
  3.) very hot or very cold field repair locations.

This object is especially important since the amount of exposure or potential exposure increases dramatically when a valve used in a dangerous service is opened for repair. Having to perform extensive seat work, in place, in these environments is a very demanding and undesirable task.

(e) to provide an inline repairable valve which does not require the lifting or disturbance of the valve actuation, whether it is of the manual, pneumatic, electric, or hydraulic type. This benefit will facilitate a quicker repair without the risk of damaging the actuation or actuation accessories such as gages, positioners, limit switches, regulators, filters, solenoids, etc., during removal and reinstallation handling.

(f) to provide a location for the easy installation and removal of one, or a set of stacked of multiple orifices in the flow passageway of any of the rotary type valves covered in this invention. Such orifice(s) will provide noise reduction, cavitation reduction and flow control.

(g) to provide a welded inline floating ball and trunnion-mounted ball valve that can easily be disassembled and reassembled using the same method of compressing the spring-loaded guide or the upstream seat, respectively, as is presently utilized. This is accomplished by turning down on the bolts holding the access port component, located on the downstream side of the valve sealing member, rather than attempt to force close tolerance sealing members in from the top of the valve, risking damage to parts and immediate failure of the valve in operation.

(h) to provide another form of angle entry rotary valve that can be installed in place of a pipe elbow. This will, in addition to all the objects and advantages mentioned above, provide for less new construction welding (since the valve and elbow location are the same only two pipe welds are required instead of four) more compact pipe design (desirable in high solids flow where minimal pipe flow resistance is required), an elbow inspection and line access (clean-out) port, and, last, but not least, an elbow wear element that can be repaired or replaced.

(i) to provide a means by which the soft (resilient) seals of a soft seated floating ball valve can be removed with ease and reinstalled without risking the seal damage that often occurs when forcing soft seats into a top entry type valve.

BRIEF DESCRIPTION OF THE DRAWINGS

Further properties of the invention will be brought out in the description which now follows, with particular embodiments of the invention being shown in the accompanying drawings which are given by way of example without any limitations being implied and in which.

Figure 1:
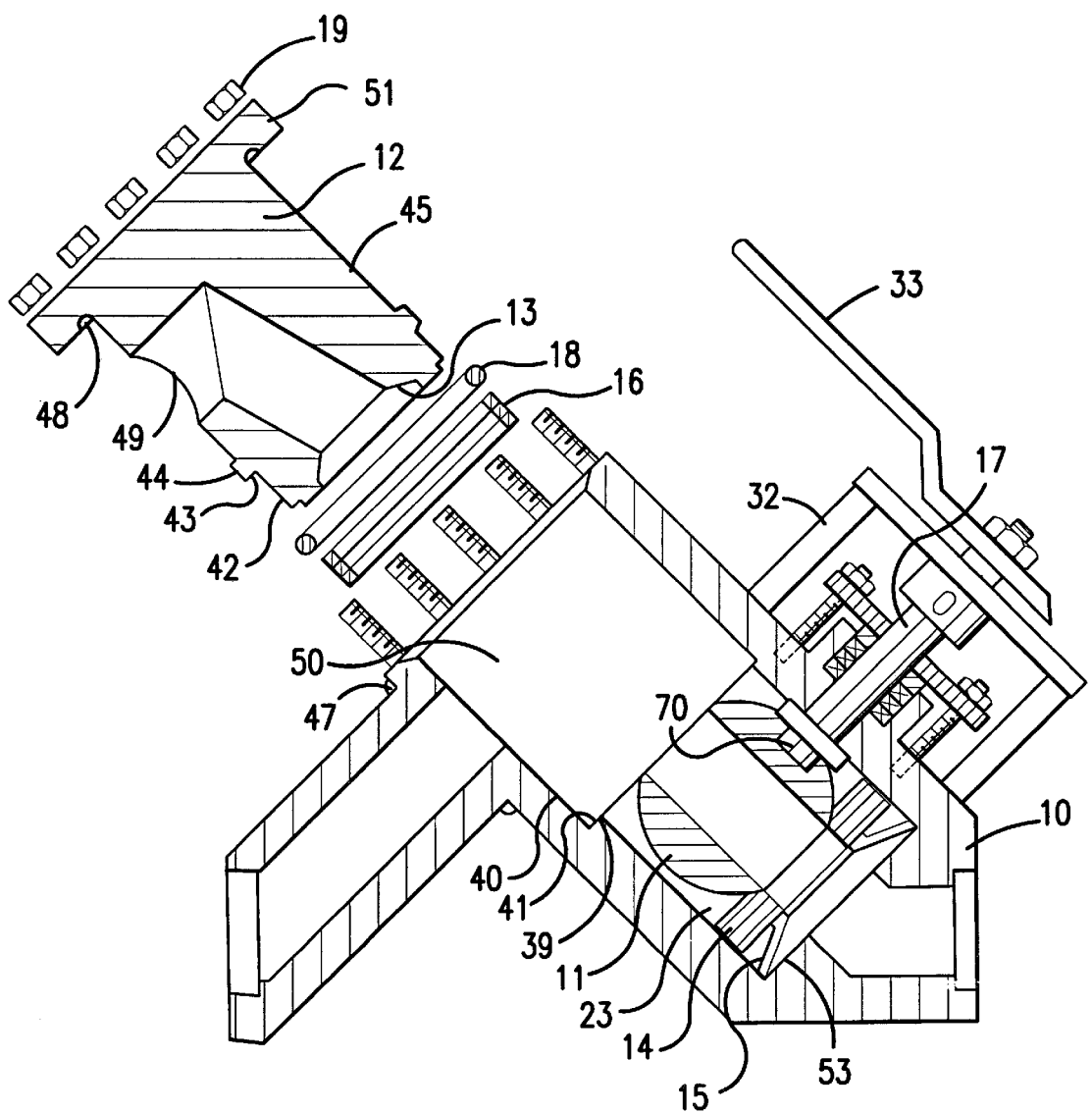
FIG. 1 is a cross sectional partially exploded view of the main components of angle entry rotary valve (hereinafter referred to as AERo valve), showing the body, valve member, seat, yoke, operator, stuffing box, stem and a component singular to the AERo valve . . . the downstream valve component (hereinafter referred to as the DVC). The DVC, its lower and upper seals, and nuts are shown in the exploded portion of the Figure.

| Reference Numerals in Drawings | |
|---|---|
| 10 | body |
| 11 | valve member |
| 12 | downstream valve component (DVC) |
| 13 | downstream seat |
| 13a | threaded-in seat |
| 13b | threaded in seat seal |
| 13c | seat in double seated valve |
| 14 | upstream seat guide |
| 15 | seat guide spring |
| 16 | lower DVC seal |
| 16a | metal-to-metal DVC seal area |
| 17 | lower stem shaft |
| 17a | lower stem shaft |
| 17b | upper stem shaft |
| 17c | one piece stem shaft |
| 18 | upper DVC seal |
| 19 | body bolts |
| 20 | first cylindrical passageway |
| 21 | second cylindrical passageway |
| 22 | first (pipeline) axis |
| 23 | first cylindrical body chamber |
| 24 | second cylindrical body chamber |
| 25 | fifth cylindrical passageway |
| 26 | sixth cylindrical passageway |
| 27 | seventh cylindrical passageway |
| 28 | second (main body) axis |
| 29 | shaft coupling |
| 30 | fourth (DVC) axis |
| 31 | fifty (outlet) axis |
| 32 | yoke |
| 33 | valve operator |
| 34 | third (closure element) axis |
| 35 | stem packing gland |
| 36 | packing gland bolts |
| 37 | stuffing box |
| 38 | third flow passageway in the pipe turning pipe body |
| 39 | second axis in the turning body |
| 40 | lower DVC seal area in body ID |
| 41 | bottom of lower DVC seal in valve body inside diameter |
| 42 | lower DVC ID seal area |
| 43 | top of lower DVC seal area |
| 44 | lower DVC guide and gland |
| 45 | recessing OD of DVC |
| 46 | flanged DVC boltholes |
| 47 | body outlet passageway weld |
| 48 | flanged DVC upper seal area |
| 49 | DVC passageway outlet hole |
| 50 | valve internal access port |
| 51 | DVC flange |
| 52 | body seal area for upper DVC |
| 53 | body chamber planar wall(s) |
| 54 | DVC lifting boltholes (threaded) |
| 55 | trunnion shaft |
| 56 | trunnion shaft cover (bolted) |
| 57 | pressure seal ring |
| 58 | pressure seal spacer ring |
| 59 | segmented retainer ring |
| 60 | pressure seal draw-up plate |
| 61 | DVC lifting holes (threaded) for pressure sealed & threaded |
| 62 | body reinforcing bar |
| 63 | spanner wrench holes |
| 64 | threaded-in DVC retainer |
| 65 | threaded-in DVC retainer weld |
| 66 | pressure breakdown element |
| 67 | segment ring body groove |
| 68 | threaded DVC retainer lower |
| 69 | upstream seated valve seat holder circumference area |
| 69a | seat for 69 above |
| 69b | seat holder OD seal for above |
| 70 | stem-to-ball slot location |
| 71 | butterfly member seal |
| 71a | butterfly member seal retainer (bolted) |
| 71b | butterfly member seal retainer bolts |
| 72 | flow turning valve member |
| 73 | bonnet |
| 74 | first turning member flow passageway |
| 75 | second turning member flow passageway |
| 76 | guide |
| 77 | compression plate |
| 78 | compression plate threaded holes |
| 79 | compression screw |
| 80 | compression screw heads or nuts |
| 81 | body slot |
| 82 | compression shoulder |
| 83 | bonnet seal |
| 84 | bonnet guide groove |
| 85 | body seal groove |
| 86 | body chamber |
| 87 | first fluid passageway |
| 88 | second fluid passageway |
| 89 | compression stop shoulder |

DETAILED DESCRIPTION OF THE INVENTION AND BEST MODE FOR CARRYING OUT THE INVENTION

The angle entry rotary (AERo) valve has three primary embodiment categories, each having to do with a variation of design shaped around the concept of turning the fluid flow path to accommodate easy-in-the-pipeline (inline) accessibility to the closure member of the valve.

The first embodiment category as shown in FIGS. 1–2, and 5–10 show the main body types relative to the pipeline flow requirements, i.e., is the valve for a straight or turning pipe. These embodiments are called the "valve body embodiments". The second category of embodiments relate to the valve flow control or flow isolation members, i.e., whether the rotating sealing member is a floating ball, trunnion-mounted full or partial ball, a butterfly, a soft seated floating ball or a flow control valve. These embodiments, hereinafter referred to as the "valve member embodiments", are shown in FIGS. 1–2 and 5–10. The last group of embodiments ar shown completely or partially in all Figures. This group, called the "downstream valve component (DVC) embodiments", relates to the function of this major valve component and to the various means by which it is installed in the AERo valve body.

Figure 2:
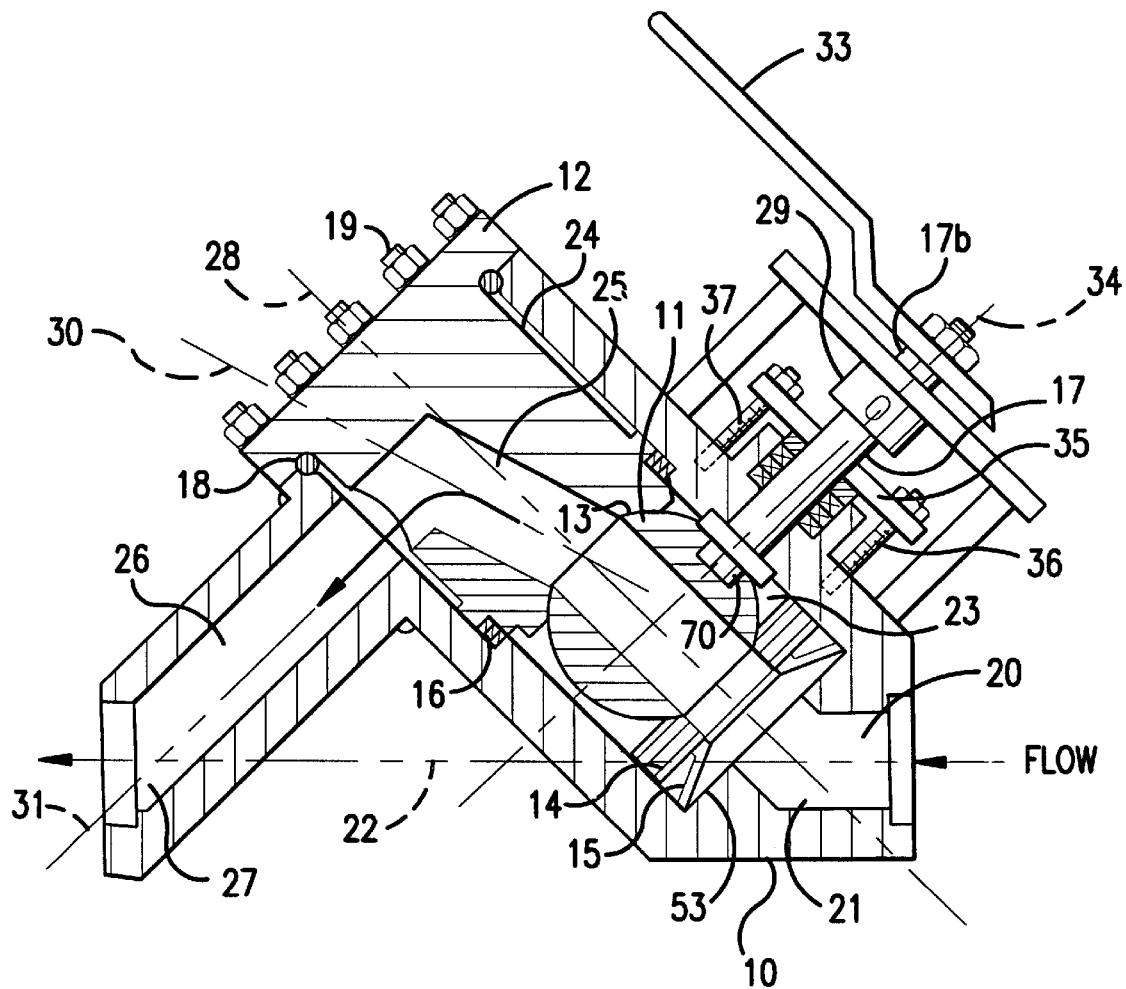
FIG. 2 is a cross sectional view showing FIG. 1 assembled.

To more fully understand the overall nature of the angle entry rotary valve we will refer to FIG. 2. The remaining Figures illustrate the various embodiments which this patent application is intended to include.

Figure 7:
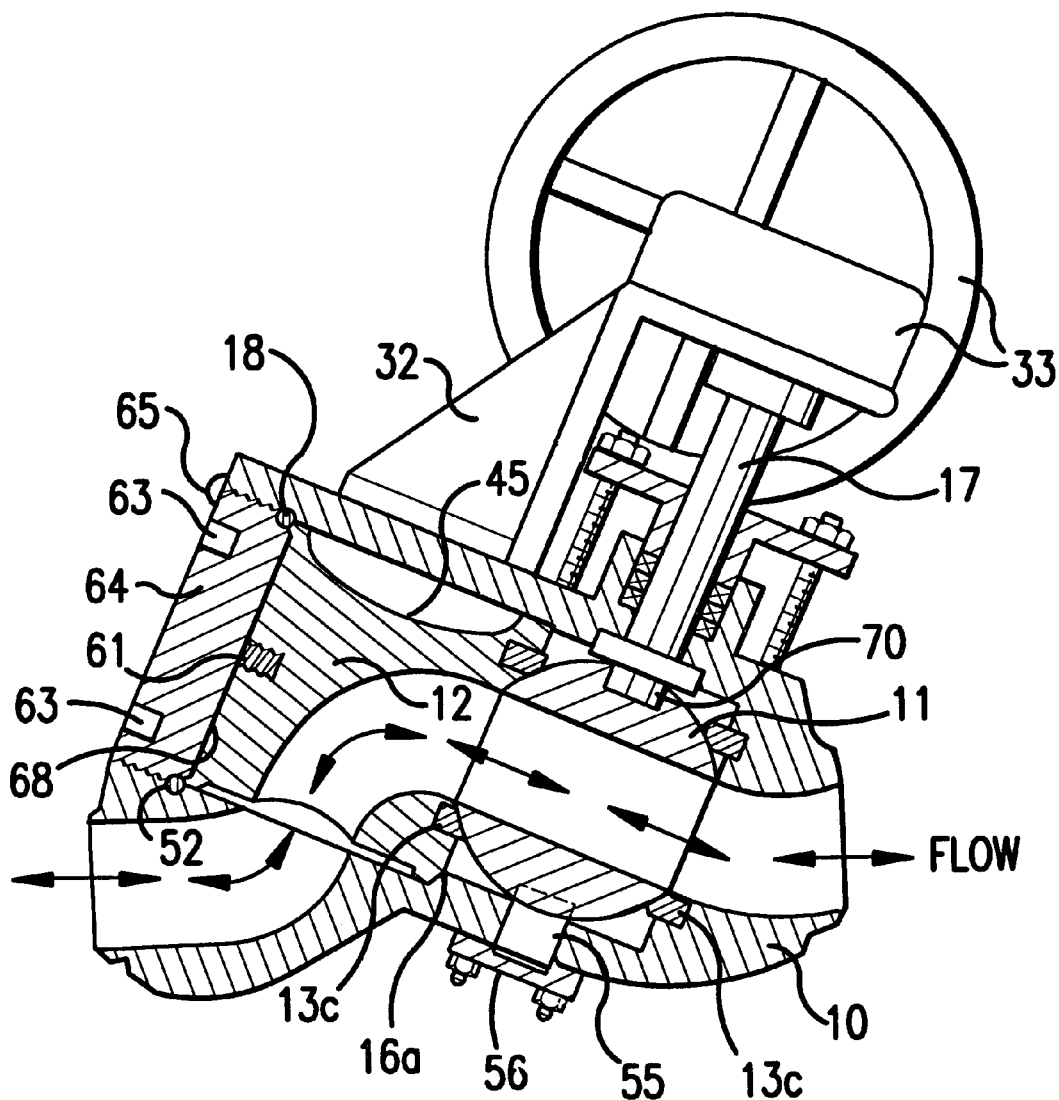
FIG. 7 is a cross sectional view of a double-seated, trunnion-mounted ball valve with a thread-in DVC and a metal-to-metal lower DVC seal rather than a resilient sealing material.

FIG. 2 shows a typical floating ball type AERo valve in the "straight pipeline" valve body embodiment, whereby the generally cylindrical or conical flow passageway 20 along the first axis 22 turns approximately 45 degrees to form a second flow passageway 21 along axis 28. Flow in passageway 21 proceeds through the sealing member 11 and into the DVC 12 where it is turned to communicate with the third cylindrical passageway 26 whose axis 31 is approximately 90 degrees to the second axis 28. This passageway is then turned approximately 45 degrees to return flow to the first axis 22 through passageway 27. The angles of flow passageway intersection in the straight pipeline body embodiment can vary greatly. FIG. 7 shows flow angles of approximately 25 degrees at the intersection of passageways 20 and 21, 70 degrees at the intersection of passageways 21 and 26 which occurs in the DVC passageway 25, and 45 degrees at the intersection of passageways 26 and 27.

Figure 10:
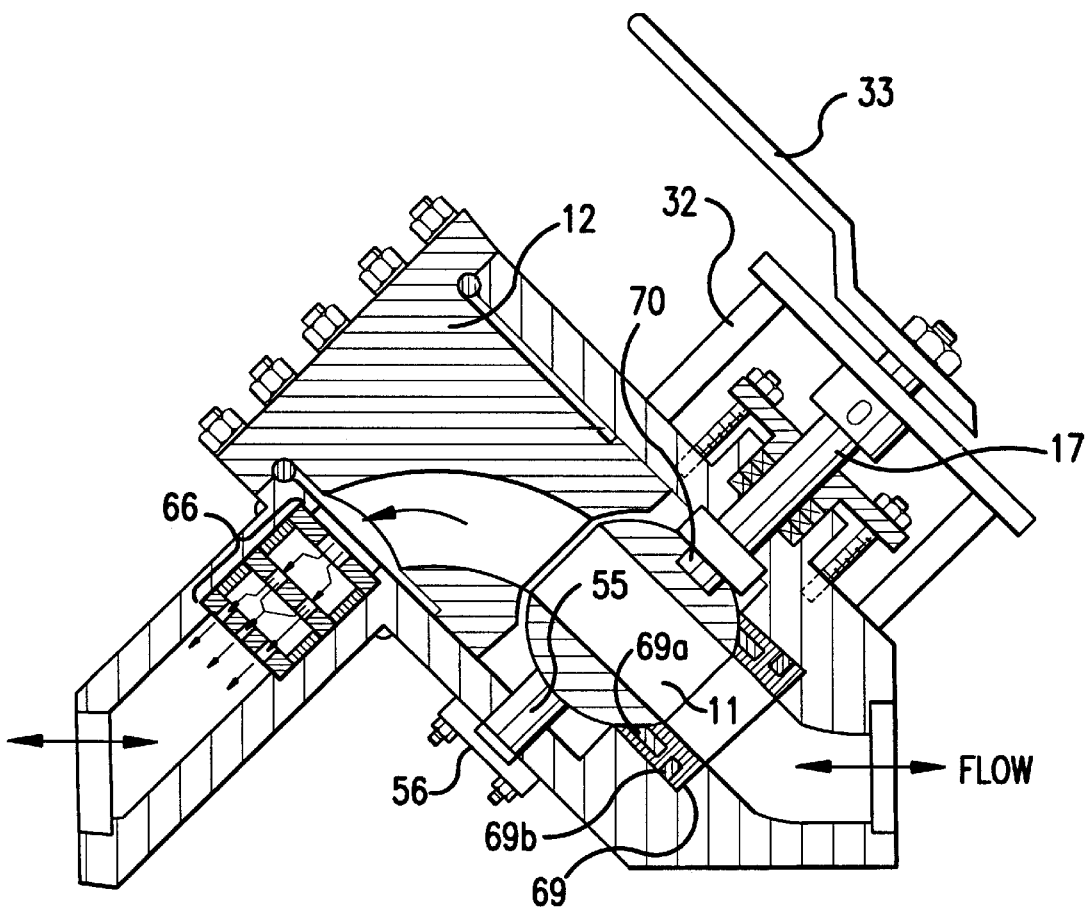
FIG. 10 is a fragmentary sectional view showing the addition of flow control elements in the downstream flow port of a upstream-seated, trunnion-mounted ball type embodiment.

Passageway turns at the intersection of each axis can be mitered, or, as shown in the preferred embodiment of FIGS. 7 and 10, rounded to a contour that would minimize any turbulent effect as media flows through the valve.

Figure 9:
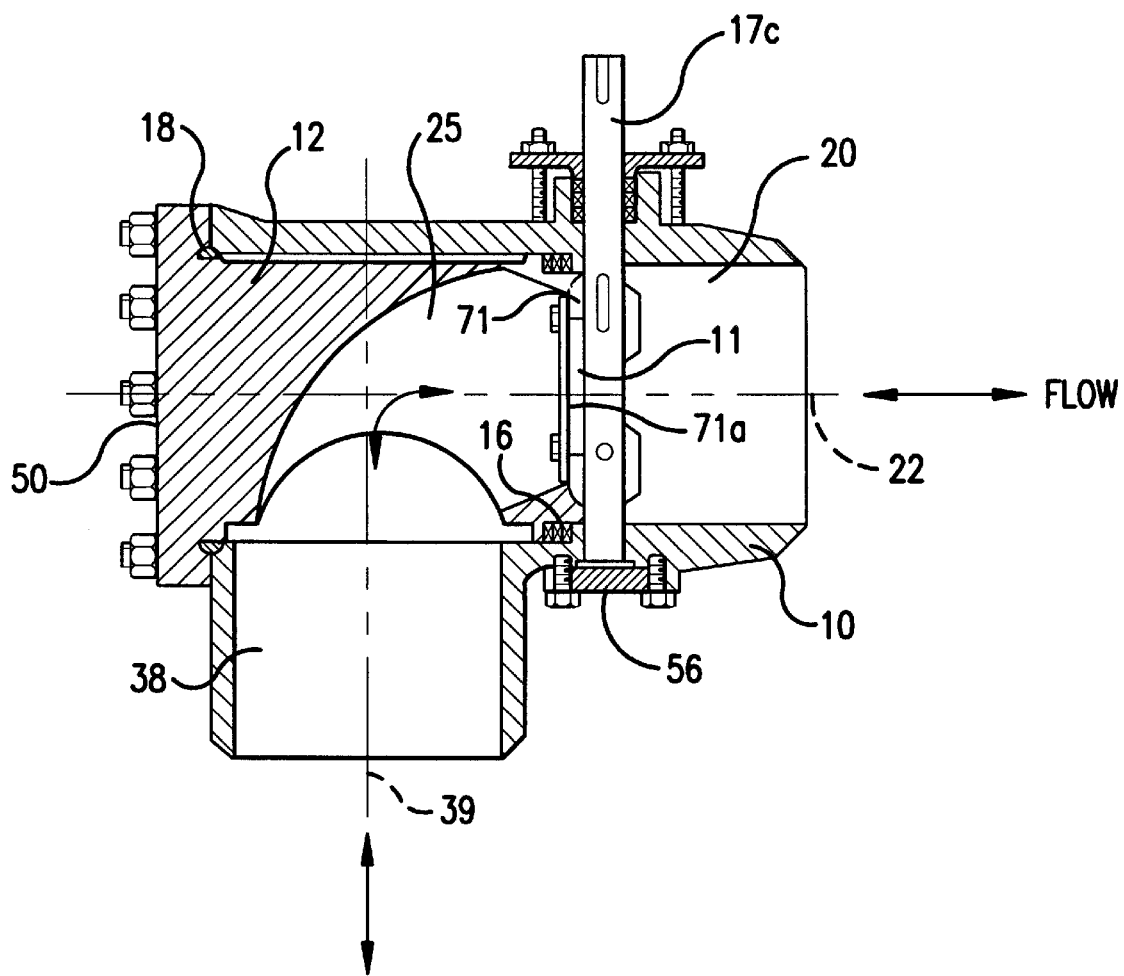
FIG. 9 is a cross sectional view of the "turned pipeline body" AERo valve with a butterfly member.

The second body embodiment, called the "turned pipeline body" is shown in FIG. 9 whereby the first generally cylindrical or conical flow passageway 20 along the first axis 22 proceeds past the sealing member 11 and into the downstream valve component 12 where it is turned 45 or 90 degrees in passageway 25 to communicate with the second flow generally cylindrical or conical passageway 38 along axis 39 which connects, without any further turning, to the pipeline. This body embodiment would be used at a location that would otherwise be a 45 or 90 degree pipe elbow.

The third, "special" valve body embodiment, is one in which the flow passageway intersection angles and/or the number of flow passageways and/or the flow passageway lengths are altered to effect substantially increased or decreased flow coefficients or to a valve into a fit into predetermined open pipe dimension.

Figure 5:
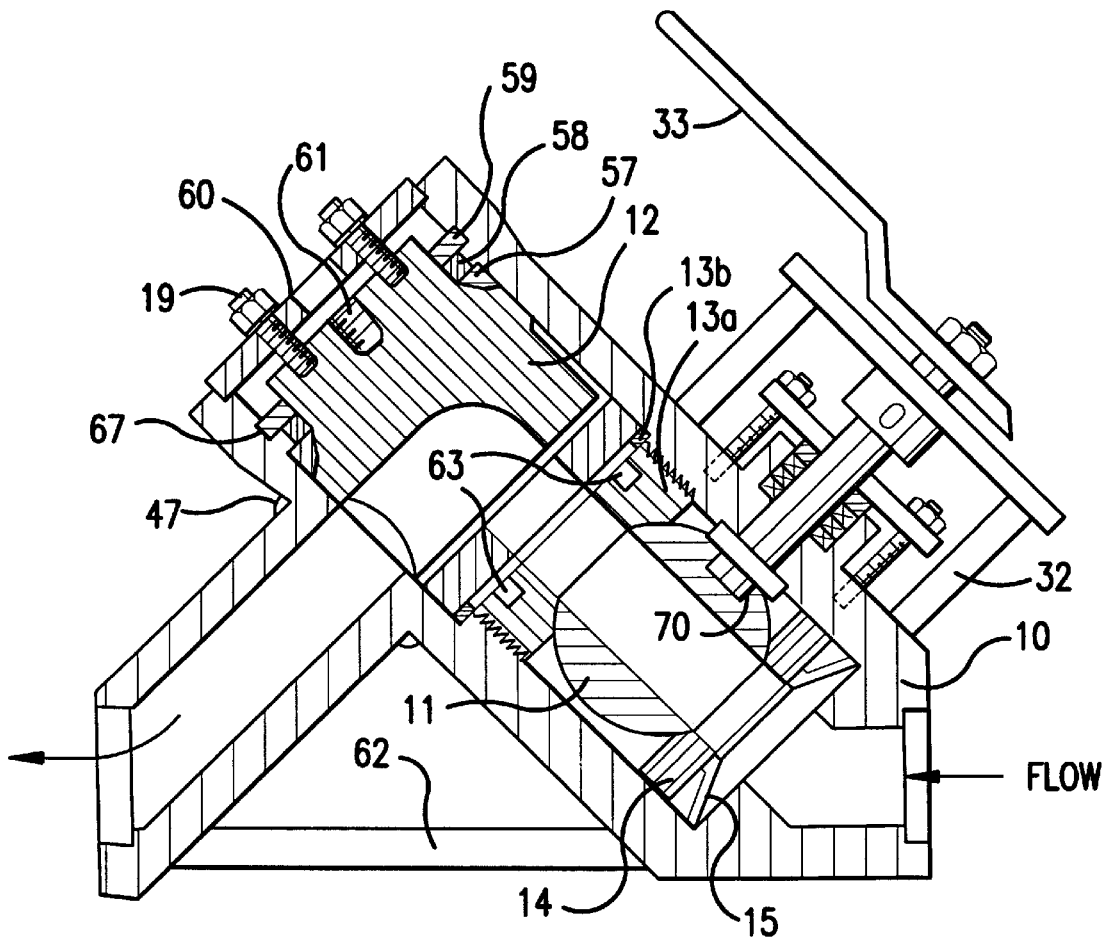
FIG. 5 is a cross sectional view of a separate threaded-in seat with a pressure sealed DVC.
Figure 6:
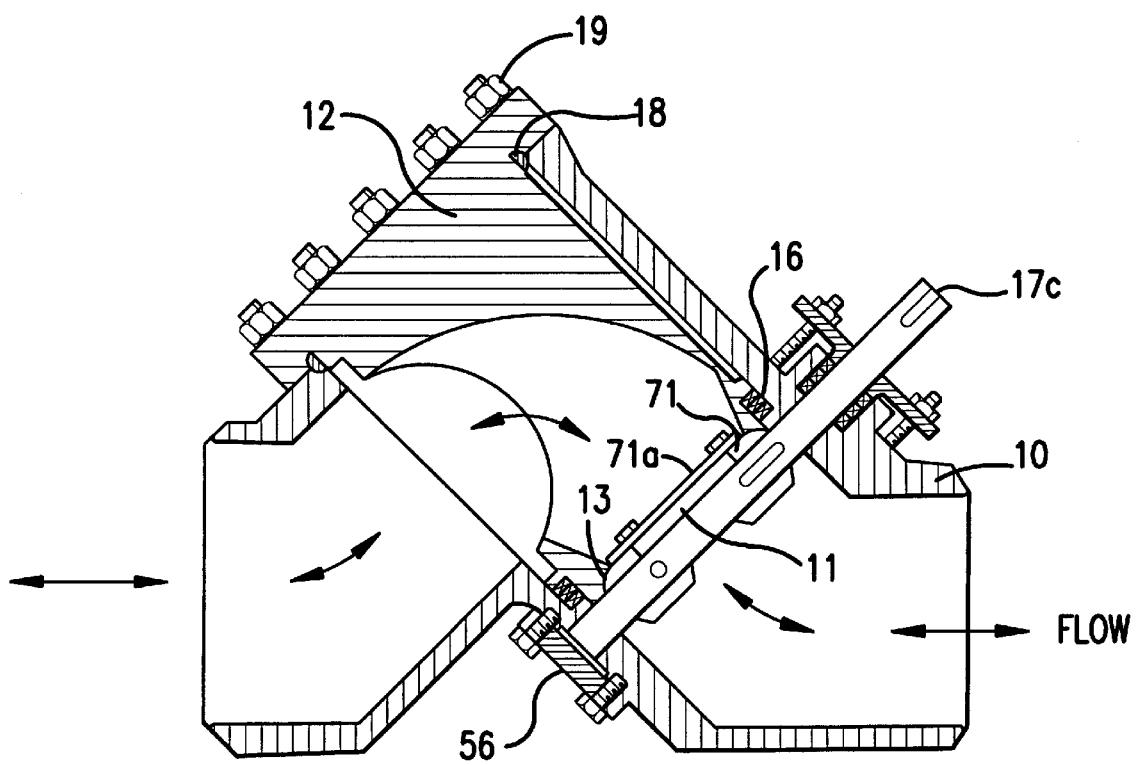
FIG. 6 is a cross sectional view of the "straight pipeline body" with a butterfly valve member.

The valve shown in FIGS. 6, 7 and 9 show the preferred body embodiment of a completely cast or forged body with sufficient wall thickness, to meeting industry standards for pressure boundary and to accommodate joint stress allowances. FIG. 7 shows a substantial increase of wall thickness at the point where flow passage way 25 and 26 converge as this is a point of highest pipe loading stress concentration. The valves shown in FIGS. 1, 2, 5, 8 and 10 are fabrications showing welded-on 47 valve outlet passageways. This method of construction is another means of construction, especially for odd sizes. To strengthen the valve body when the outlet pipe is welded on, a webbing, usually consisting of the same material as the valve body, connecting the outside body of passageway 26 and 21 can be added as shown in the embodiment of FIG. 5. Lastly, with regard to body configuration, the welded-on outlet pipe can be eliminated altogether when the piping to which a valve is being installed can connect directly to the main body adjacent to the discharge side of the DVC. This can be done with either a 45 degree elbow for valves which have the same inlet and outlet centerline, or by straight pipe for valves of the turned pipe design as shown in FIG. 9.

Valves covered in this document will be subject to standards of various organized bodies duly recognized as the industry's manufacturing guidelines. The preferred embodiment for connecting the AERo valve to the pipe will be by means of a socket weld or butt weld in accordance with American National Standards Institute (ANSI) B16.25. Valves may, however be of the flanged, ring type joint, wafer body, lugged, or clamped but style end connections or any workable combination of joint thereof. Valve body wall thicknesses will conform to ANSI B16.34 1988 with ratings in the 150, 300, 600, 800, 900, 1500, 2500 and 4500 classes and be built to intermediate, limited, and special class ratings in all pipe sizes as allowed. Materials of body construction will be per customary requirements for given service conditions. Frequently used material swill be low alloy carbon steel, stainless steel and nickel and nickel alloy materials.

Figure 3:
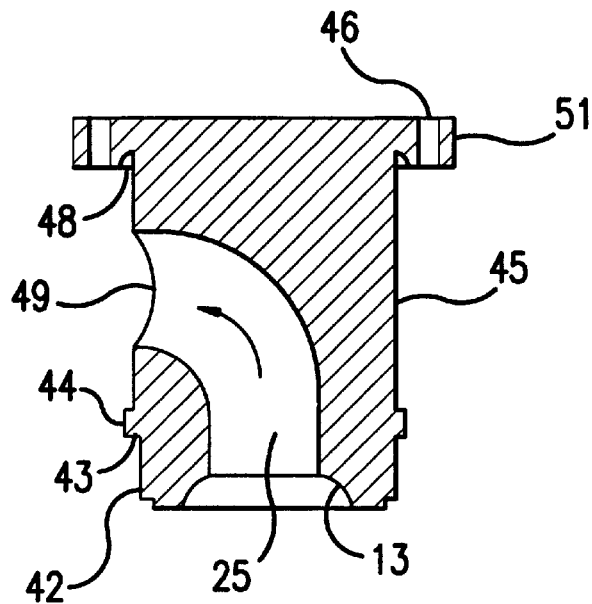
FIG. 3 is a cross sectional view of the bolted flange type DVC.
Figure 4:
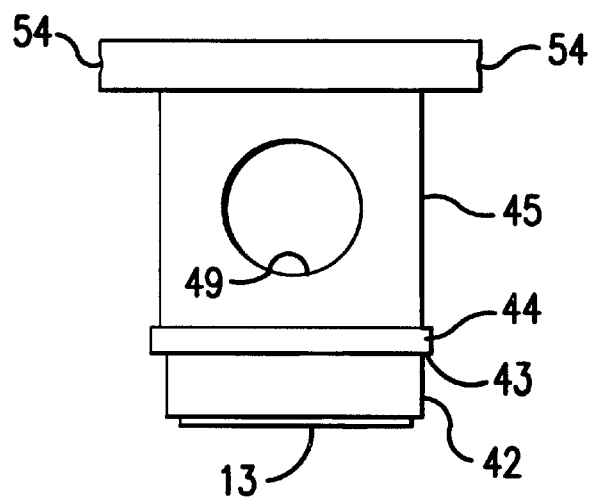
FIG. 4 is an elevational view from the third flow axis of the bolted flange type DVC.

A wide variety of yoke designs and valve operators are used and wide known in the art. Operators including lever 33, handwheel, worm gear in FIG. 7, spur and bevel hear, motor, air and hydraulic units suitably rated for the service conditions and operating torque requirements. Each FIG., except FIGS. 3 and 4, show the typical valve stem shaft (17 and 32 in FIG. 2) and stuffing box (37 in FIG. 2) arrangement to be utilized. Materials of construction will again vary according to the requirements of service conditions. Typically, a graphite and/or carbon stem packing will be installed and compressed in the stuffing box for valves exposed to flow mediums in excess of 450 degrees Fahrenheit while PTFE or other appropriate material will be used in lower temperature and cryogenic service conditions.

Reference has been made to the DVC previously to describe the flow path of the AERo valve. The embodiments of the DVCs vary depending on whether the valve access 50, at the end of axis 28 furthest from the flow line axis 22, is a bolted down flange style as shown in FIGS. 1–4, 6, 8 and 10, threaded as shown in FIG. 7, or a pressure seal style shown in FIG. 5.

Figure 8:
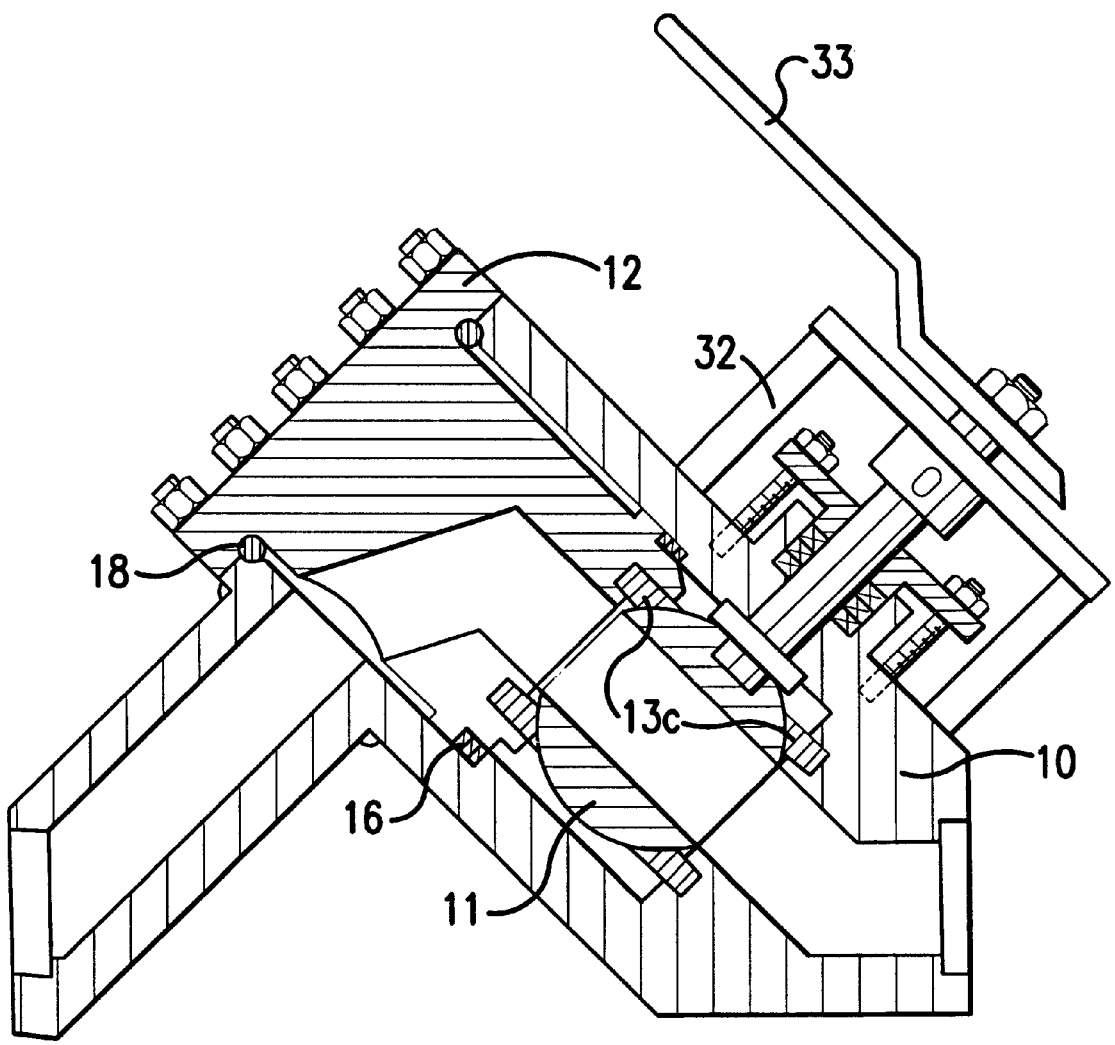
FIG. 8 is a cross sectional view of a double-seated floating ball similar to FIG. 1 and 2, with sealing on both sides of the ball.

The bolted flange DVC embodiment, detailed in FIGS. 3 and 4, combines four key features into one component. Hence the need for a new part name "DVC" which more appropriately describes the multiple functions this part performs in the AERo valve. Three of the DVC features are found in almost every valve known, i.e., the seat, the seat to body seal and the cover, or bonnet. The fourth feature, often a part of general isolation and control valve body flow passageways, but not a part of a multifunctional internal component, but is integral to the DVC, is a flow turning passageway. This passageway 25, in all body and valve member embodiments, communicates with the flow passageways on axis 21 and 26 to effect a continuous flow from the axis created for valve maintenance 28 to the axis of the pipe flow line 31. The passageway can be one of intersecting cylindrical chambers (mitered) as shown in FIGS. 1, 2, and 8 or, can be a contoured arched chamber of a generally cylindrical shape as shown in FIGS. 3, 5, 6, 7, and 9.

The preferred threaded and pressure sealed DVC embodiments differ from the flanged embodiment in that the seat is separated from the main DVC in the pressure seal style, and, the threaded style utilizes a threaded retainer to fix the DVC in to the valve. A separate seat is required in the pressure seal style due to the fact that, during assembly, the upward pull of the DVC would relax the force required to position the DVC seat to sealably mate with the valve member. A threaded retainer 64 (plug or plate) is preferred in the threaded-in DVC due to the fact that this design makes the DVC manufacturing easier. With this design it is easier to make sure that the DVC flow outlet hole 49 and the contiguous flow passageway 26 are concentric after the DVC is completely threaded into the body.

The pressure sealed DVC can be clamped (Greylock style) or, as shown in the preferred embodiment in FIG. 5, bolted through a DVC draw-up ring 60. The pressure seal configuration, like the flanged, is widely known in the art. By drawing the DVC 12 and its seal ring 57 against a spacer ring 58 and segmented ring 59, the later of which are inserted into a full circumferential groove 67 in the inside diameter of the valve body, the AERo valve access port is sealed. When a pressure seal arrangement is used for the downstream valve component it is preferred that a separate seat ring 13*a* is bolted (with a gasket 13*b*), welded, or, as shown in its preferred embodiment in FIG. 5, is threaded and gasketed into the inside diameter of the valve body 10 to communicate with the rotatably disposed closure member 11 and to compress the gasket and to prevent leakage from finding a path between the seat ring 13*b* and the valve body 10. The pressure sealed downstream valve component can be used with all of the various body and valve member embodiments described herein.

The threaded-in DVC is the same as the bolted DVC except for the means by which it seals off the access port 50. The upper DVC seal body area 52 is deeper, and, therefore lower into the valve body as shown in FIG. 7. It is also threaded to accommodate the retainer 64 compression function. The seal 18, in the preferred embodiment, is a non-metallic material suitable for the service desired. In the preferred embodiment a snap-type retaining ring is fitted into a circumferential internal body groove above the retainer 64 to lock the retainer in its design position. Another locking embodiment, as shown in FIG. 7, is to place a spot weld 65 joining the retainer to the body. The bottom of the retainer is in the preferred embodiment flat or equipped with a thin push plate, generally made of the same material and in the same diameter as the threaded retaining plug (plate), to provide straight axis compression of the upper DVC seal 18. The retaining ring's lower circumference 68 protrudes slightly below the seal shoulder 52 in very close diametrical clearance so as to prevent the seal material from extruding into the valve body, and, thereby diminishing the effectiveness of the seal. The retaining ring 64 is turned into the AERo valve body 10 (by use of the spanner wrench holes 63) a prescribed distance as measured from the top of the valve body at the access port 50. This distance will assure that the upper and lower DVC seals are sealably compressed and that the valve seat is positioned to perform the sealing function with whatever member embodiment is used.

For easy removal of the DVC in valves with the threaded retainer a hole 61 is drilled and tapped into the top center of the DVC, wherein a threaded eyebolt can be installed and a sling can be attached to the bolt at the time of DVC removal to enable the DVC to pull from the valve body. Naturally, the eyebolt and sling would be used for reassembly. Large valves may require more than one eyebolt hole.

The angle of flow passageway turn in the DVC can vary depending on the overall flow requirements and end to end length of the valve. The inside of the DVC passageway 25 can be one of gradually reducing or expanding diameters, or one of dramatic diameter change(s). The later may be used for very severe service conditions where it may be prudent to take a large pressure drop at the outlet of the DVC 49, where the diameter would be substantially reduced, rather than across the valve seat and member. This would reduce the damaging effects to the shutoff sealing surfaces on the seat and member when high velocity erosive flow occurs, especially when a valve is operating within twenty-five percent of the closed position for extended time periods.

The material used in the DVC is generally the same as the valve body material with the exception of the seat surface. This area will contain either a soft inserted material such as PTFE or a hard material such as a weld overlay or a sprayed metal hardcoating. For very severe service conditions where highly erosive forces are known to exist, a weld or thermal spray hardcoating can be applied to the flow passageway 25.

The word "downstream" in DVC refers to the side of the valve which is exposed to medium flow after it passes through the first 20 and second 21 passageway and the valve closure member 11. The term "downstream" is used to indicate the direction of flow when the valve is primarily intended to flow in one direction only (unidirectional). However, the term will also be used to describe the component even if flow is intended to be in both pipeline directions (bidirectional). Valves shown in all Figures are bidirectional with the exception of FIGS. 1, 2 and 5 which, as shown, are unidirectional, but, can be configured to be in the outside diameter of the upstream seat guide 14 and providing seating shoulders in the valve body where the guide ring 14 communicates with the valve body.

Referring to FIG. 1 the inside of the valve body is comprised of two cylindrical chambers 50 and 46, and a third chamber 52 which houses the upper DVC seal 18. The third chamber can be angled or radiused to house a metal seal ring 18 as shown in FIGS. 1–3, 6, 8–10. FIG. 5 shows a conventional pressure seal design. Additionally, chamber 52 can be flat to accommodate a gasket, or lengthened and threaded to accommodate a threaded and gasketed DVC.

Referring to FIG. 2, the first chamber 50 disposes the closure member (ball) 11, upstream seat guide (a ring with a radius on the surface which communicates with the ball member to assure true alignment of the ball) 14 and the closure member guide (belleville) conical loan spring 15. The second body chamber 24 houses the downstream valve component and its upper 18 and lower seal 16. The shoulder 41 is the demarcation between the two body chambers.

The DVC in FIGS. 3 and 4 is a cylindrical component of varying outside diameters to accommodate the access port cover (integral flange) 51, the turning passageway 45, the lower guide and gland 44 and the lower seal inside diameter retaining surface 42. The seat which communicates with the closure member is radiused to mate with ball surface as shown in various ball valve Figures or in the case of a butterfly closure member, it can be of a radius or taper angle. Load on the seat is determined by the overall protrusion of the DVC through the second body chamber 24 and into the first body chamber 50 after being secured to the valve body.

In the preferred DVC embodiment, the lower seal ID retaining surface 42 accommodates a die formed graphite or polymer-based ring 16 (material will depend on operating temperature and other conditions) with a seal height of one to 5 times the seal cross sectional dimension. The seals cross section is determined by the following formula:

$$\frac{ID \text{ of second body cavity } 24 - OD \text{ of lower } DVC\ 42}{2}$$

$$ID = \text{inside diameter} \qquad OD = \text{outside diameter}$$

Anti-extrusion rings, generally made of braided carbon or PTFE etc., or a compressed mesh of any of numerous woven metals compatible with the service conditions, can be placed at the top, or, at the top and bottom of the lower DVC seal to further extend the seal life. Further, instead of the lower DVC seal ring being one center ring with separate anti-extrusion ring, the anti-extrusion rings can be die formed into the center ring so that the seal is one piece. The center ring can also be a stack of rings as opposed to one monolithic ring. This stuffing box-like seal design allows for substantial seal compression to assure positive long term sealing over the smallest diameter possible, thereby reducing the need for expanding the body diameter to accommodate a spiral wound type gasket which requires a wider sealing surface on a plane perpendicular to the DVC loading axis 28. This stuffing box-like seal is also more forgiving in this sealing application whereby one compression source 19 is required to simultaneously engage two separate seal locations, i.e., the "to atmosphere" upper DVC seal 18 and the "behind the seat" lower DVC seal 16. The lower seal inside diameter retaining surface 42 and the first valve body chamber 50 overlap and the diametrical clearances here and between the second body chamber 24 and the lower guide and gland 44 fully retain the lower downstream valve component seal.

Another embodiment of the DVC is to directly mate the lower DVC to the body effecting a 360 degree continuous metal-to-metal sealing contact. Stainless steel or other suitable DVC material or hardface overlays would be necessary to give these sealing surfaces integrity and longevity. Assuming that some lapping of this lower DVC mating surface would be required over years of service, and that any such lapping will seal contact surfaces, the upper DVC seal 18 must be a graphite or resilient polymer, and not a metal ring, to accommodate the greater compression dimension that will occur from lapping the lower seal. Assuring the dimensional relationship between the lower metal-to-metal seal and the DVC seat will have to be part of the routine maintenance procedure. The addition or removal of body or DVC material may be required to reestablish all critical sealing and valve member-to seat dimensions.

Another embodiment of the DVC is used in upstream seated valves like the one shown in FIG. 10. Here the DVC does not perform the functions of valve seat, or behind-the-seat seal. Therefore, it has no seat or lower DVC seal area.

The outside diameter of the DVC 45 between the lower guide and gland and the cover is reduced to minimize binding which can otherwise occur during the removal and reinstallation of this component. As in FIG. 7 the outside surface of the DVC may be substantially reduced in mass by reducing wall thickness, contouring the surface to match the flow passageway and adding rib supports as may be required for the DVCs structural integrity.

The outlet hole 49 of the downstream valve component is generally of a circular or oval shape, but can be of a variety of shape configurations if the service application requires altering a valves flow pattern.

Operation of the DVC

The DVC is a stationary component in an operating valve. In all AERo valves, the DVC turns the flow passageway that allows inline access to the valve internals back toward the direction of the connecting downstream pipe, and, it is the removable pressure boundary part that permits access to the inside of the valve. The sealing functions of the DVC can depend largely upon which type of member embodiment is used and whether or not the DVC has a seat.

In the single and double seated floating ball valves shown in FIGS. 1, 2, 5 and 8 and in the double seated trunnion-mounted ball valve shown in FIG. 7, the DVC 12 provides the compressive load necessary to suspend the ball in the floating ball valve, and, to mate the valve member to the seats in the floating ball and downstream seat of the trunnion ball valve. In the pressure seal embodiment shown in FIG. 5 a separate seat ring 13*a* performs the downstream ball suspension and loading functions. In the single upstream seated valve shown in FIG. 10, the DVC functions as an access port cover and flow turning element. In the butterfly valves shown in FIGS. 6 and 9, the DVC neither suspends the ball nor loads the disc to the seat. It does, however, provide a fixed circumferential mating surface for the disc member to seal against.

Operation and Description of Valve Member Embodiments

The repair operation/method of all AERo valve embodiments is unlike any other rotary valve type. It has all the best features of a top entry and a split body/side entry valve. The repair of the AERo valve, with the exception of being done on an angled axis relative to the pipe, is the same as repairs to a split body valve or side entry valve. In the typical embodiment, the DVC is removed through access port 50, and all of the valve parts that need to come out for service can be retrieved through this location. After necessary repair work is complete the DVC is inserted back into the AERo valve body chamber through the AERo valve access port 50 and positioned to stem shaft connections (70 in slotted ball styles), and aligned so that the DVC flow discharge port 49 lines up with the valve body flow passage along axis 31 for straight pipe valves and 39 for turning pipe valves.

Prior to DVC installation the lower DVC seal ring 16 is carefully placed around the DVC at 42 and the upper seal 18 is placed on the body mating surface 52. (In the threaded and pressure seal DVC embodiments the upper DVC seal can be installed after the DVC is placed into the valve). Then the DVC is placed into the valve body and fastened in its stationary position in body cylinders 23 and 24. Drilled and tapped holes opposite each other 54 on the flanged DVC 51 and on top center 61 on the screwed and pressure sealed DVC, serve as anchor points for (eye)bolts or studs to which a lifting sling is attached for DVC handling during removal, repair and reinstallation.

The use of ball valves and butterfly valves to control or isolate the flow of fluids is very well known in the art. Valves are selected based on their flow characterization, flow capacity, degree of shut-off capability, body pressure rating and user acceptance of the different designs available. Valves built using the "straight pipe" AERo body design will, given equal inside flow diameters as valves built with a split body, side entry or top entry, (hereinafter referred to as conventional (rotary) valves) have a reduced flow capacity. This is due to the frictional loss associated with the plurality of flow passageways in the AERo valves compared to only one passageway in conventional valves. In some service applications this comparable flow reduction may not be of consequence since a flow reduction is often desired. In others it will necessitate an enlargement of the AERo valve internal flow passages to achieve large flow coefficients. AERo valves built using the "turning pipe" embodiment shown in FIG. 9 will not reduce line flow rates any more than would a pipe elbow of equal length, radius and internal diameter.

Unlike conventional valves, "straight flow pipe" AERo valve stem 17, yoke 32 and operator base plate (topworks) will be on an angled plane relative to the pipeline, rather than on a parallel plane with the pipe. The "turned flow pipe" AERo valve will, however, have the same topworks orientation as do the conventional valves. In horizontal pipe installations the angled operator will have minimum effect on the ease of opening or closing a valve regardless of the valves flow direction, especially if the valve is equipped with a bevel or worm gear operator with the face of the handwheel facing the person turning the valve to the desired position, as shown in FIG. 7. In vertical pipe installations, with the flow up, the non gear opgrated valve will operate very much like a direct wheel or T-handle operated Y type globe valve in a flow down service, i.e., with the handwheel face slanted toward the ground. In vertical pipe installations with the flow down, as is most often the case on industrial and power boilers, particularly in waterwall drain duty, the AERo valve will provide an easier angle of operation for the person as the handwheel will be facing slightly upwards. Ergonomically, this is a preferred handwheel position for a person as this position will allow a plant operator to utilize his or her entire body to manually cycle a valve, rather than just the upper body, to more a valve member requiring high turning torque.

Rotary valves using the AERo valve body will consist of a full round and modified sphere ball, a fractional ball (which has an outside surface area which, at its widest part, is approximately the dimension of the outside diameter of the valve seat), V-ported ball or a butterfly valve disc member. These members generally rotate 90 degrees to cycle from the full open to the full closed position, and vise versa. Some valves, however, may cycle less than a full 90 degrees and others may cycle up to 180 degrees or more in their normal operation.

The floating AERo ball valve in FIGS. 1, 2 and 5 shows the typical arrangement of valve components, i.e., a cylindrical body interior 23 housing a belleville member loading spring 15, which communicates directly with the planar upstream body wall 53 and the flat upstream side of the upstream seat guide 14. The radiused opposite side of the upstream seat guide 14 along with the radiused downstream seat suspend the ball 11 on center with the valve stem 35 axis 34. In the preferred embodiment shown in FIGS. 1 and 2 the downstream seat is not spring loaded. The downstream seat may be a resilient PTFE type material or a hardfaced material insert, or, as shown in FIGS. 1 and 2, and previously written, it is a hardface material applied directly to the seat surface base metal, and therefore considered integral to the seat. The belleville spring 15 provides a preload to hold the ball against the seat under low operating pressure. After the line pressure against the upstream side of the closed ball has exceeded that which the spring has applied, the spring becomes inactive as a loading force and the valve is sealed using the force of differential line pressure acting over the exposed surface on the upstream side of the ball member. Once past the seat in the floating ball the medium proceeds through the flow passage 25 of the DVC where it is turned to communicate either directly with the pipeline (turned pipeline valve) or to another passageway which then connects with the pipeline.

FIGS. 6 and 9 show the typical butterfly AERo valve member embodiments. In FIG. 9 the flow medium moves into the first passageway 20 along the flow axis 22 communicates directly with the valve member 11 or as shown in FIG. 6, is turned to communicate with a second flow passageway which is in the same axis as the valve member 11 and DVC 12. Unlike many ball valves which require a spring preload, the butterfly valve simply relies on torque loading of the member against the seat. This loading torque is often boosted in high pressure valves by offsetting the disc 11 on the shaft 17 to render a camming effect of the member 11 to the seat 13. Member and seat sealing configurations can vary depending upon the service conditions and user history. Typically, rubber, polymer or graphite-based resilient seat materials are used with the valve whereby the valve member retains a resilient sealing material and the seat is either the valve body material or a more durable metallic overlay. For reasons explained below, the later closure seal arrangement is the preferred AERo valve embodiment.

Like FIG. 1, the AERo butterfly valves shown in FIGS. 6 and 9, have DVC seats 11 which will be removed as part of the routine repair teardown. Unlike the floating ball design in FIG. 1, where the ball member can be pulled out of the valve (after the valve is cycled to the closed position to line up the slot in the ball and stem shaft 70 with the flow passage) immediately after the DVC is removed, the removal of the butterfly valve member will require the disassembly of the trunnion shaft, unless the member 11 (not the seat as is often done with butterfly valves) has a retained resilient closure seal 71.

Note that butterfly valves are inherently trunnion-mounted due to the need to provide a means to fix the axis of rotation so that the circumferential sealing surfaces of the valve member 11 and seat 13 will repeatedly mate to perform the valves flow control and isolation functions. The disc member is shaft mounted (and pinned and/or keyed) with either a two piece shaft, as shown in FIGS. 6 and 9 or, a one piece through-the-member (disc) shaft.

With a retained member seal design the valve member and trunnion do not have to be disturbed in the process of valve closure element repair. Once the DVC is removed through the AERo access port 50, the mechanic turns out the retaining bolts 71b (often recessed sockethead bolts) holding the member seal 71 in place. The member seal 71 is then either refurbished or replaced with a new seal. The valve seat 13 is restored outside the valve body. Note that unbolting the valve from the line, and rebolting it back in after repair is, as with all AERo valves, not necessary. If the trunnion is in need of inspection, bearing 55 changeout or other repair it can be removed through the bottom access port 56. Trunnion design and installation/removal method is well known in the art.

Another embodiment of the AERo body valve is the trunnion-mounted ball valves shown in FIGS. 7 and 10. With trunnion-mounted valves, the member turns a bottom post 55, which largely service the purpose of bearing the weight of the valve member and of providing a means to fix the member in an axis which will enable the seats to move against it and seal. Unlike the floating ball concept, the trunnion style ball valves rely on floating seats. That is why the seat ring (holder) 69 in FIG. 11 has an outside diameter seal 69b. As the ring moves in response to increased or decreased line pressure the OD seal ring 69b maintains the tight shut-off of the valve. Some trunnion-mounted designs allow minute movement in the post section, so that the valve may have the advantages of weight bearing while still having some float. The valve in FIG. 7 reflects this style. Since, like a floating ball, the ball member is actually moving, there is no need to seal the OD of the seat rings, which may otherwise move. Hence there are not OD seals in the seat rings of this style valve.

The trunnion's load bearing function spares the seat and upstream guide from carrying the member and therefore substantially reduces the amount of torque required to operate the vale. Reduced torque results in smoother valve operation and smaller manual gear, pneumatic, electric or hydraulic operators 33. On very large size valves in high pressure service trunnion mounting can reduce valve operator cost and result in an overall lower valve manufacturing cost.

FIG. 7 shows a double seated trunnion-mounted member and FIG. 10 shows a single upstream-seated trunnion-mounted member. Valves of either member embodiment can be metal seated or resilient seated, again depending upon the service conditions. Additionally, it is common to use belleville style springs between the planar body walls 53 and the seat rings as preload mechanisms to allow this type of rotary valve to achieve tight shut-off even at very low operating pressures. Trunnion-mounted member embodiments are well known in the art, and as with all member embodiments, the AERo valves are an enhancement of the maintainability of conventional valves. The closure seal repair method for trunnion-mounted ball valves will, unlike all other member embodiments, require the additional step of disengaging the trunnion-to-ball mounting connection. This is done by removal of the trunnion cover plate 56 and pulling the trunnion away from the ball member 11. Once the trunnion is disengaged, the stem slotted ball will be freed-up to be pulled out of the valve body through the AERo valve access port 50.

Finally, with regard to valve member embodiments, FIG. 8 shows a double seated floating seat ball valve. As with other AERo embodiments this member embodiment is well known in the art. The valve member, which is often a stainless steel, with a chrome polish or hardcoaring such as tungsten carbide, is disposed between an upstream and a downstream seat ring. The seat rings can be made of a variety of metals, many known for their corrosion resistance, graphite, PTFE or graphite impregnated PTFE. Material selection for valve construction varies greatly. It is not the intention of the AERo valve designs to offer any new valve body or valve trim metallurgy, or seal material, or combination of materials. Mention of materials is made to provide general information as to materials commonly used, and, to further the readers understanding of the art in which the AERo valve is involved.

Referring to FIG. 8, the seat rings 13c are urged into the grooves in the interior body planar walls 53 (or without grooves) and against the ball by the compression force applied when the DVC 12 is installed (in a fashion similar to an end cap on a split body valve) to the valve. The assembly compression of the DVC acts as a sealing load force, which, under low line operating pressures seals the valve member to the seat communicating with the line pressure. In some designs, assembly compression load can be overcome by line pressure. When this happens the valve member is forced in the direction of flow and against what is the downstream seat relative to the pressure source. The downstream seat, therefore, becomes the shut-off point as the medium loads the upstream face of the closed ball member, and often penetrates past the upstream seat to fill the valve body cavity with the pressurized medium.

One skilled in the art will recognize that the location of the ball slot on the ball, the location of the actuator and access port may all be varied in the practice of the present invention. Before describing how the location of features varies, it is important to understand terminology relating one valve part to another relative to the orientation of the valve as it is installed in the pipe. Since a valve can theoretically be installed in an infinite number of spatial positions in a pipe, relative locations of valve parts and features can become confusing. For example, a catalog picture of a gate type valve generally shows the valve with its stem in the vertical position. However, if the valve was installed in a vertical pipe the stem is now horizontal. It becomes important to distinguish a starting reference point especially when describing new design approaches.

Therefore, the standard point of reference utilized in this patent description shall be the vertical centerline plane (VCP) that runs through a horizontal pipe to which the valve being described is attached. This relative feature orientation is used for clarification purposes only and does not limit the location and position of the AERo valve's application. This reference point usage will become more readily understood as various additional embodiments are described.

Figure 11:
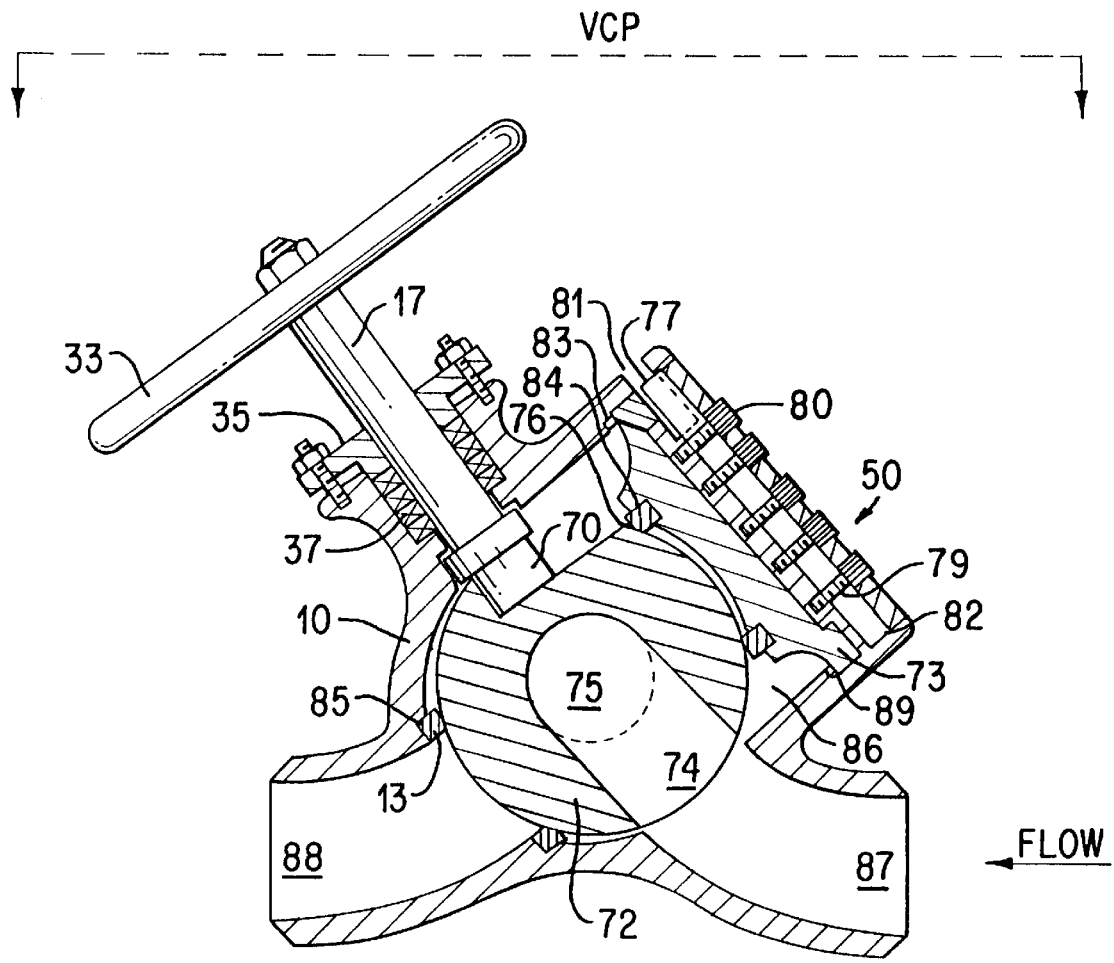
FIG. 11 is a cross sectional view of the main components of the first preferred embodiment of the straight pipe AERo valve in the closed position. This figure also shows the compression plate means for retainment.

To further understand the nature of these additional embodiments of the AERo valve we shall refer to FIG. 11 which shows the first preferred "flow turning embodiment" utilizing a floating ball type AERo valve in the straight pipeline embodiment, whereby the generally cylindrical or conical flow passageway 87 along the VCP turns approximately 45 degrees toward the first turning member flow passageway 74 within the flow turning valve member 72.

Flow in passageway 74 turns approximately 90 degrees and perpendicular to the VCP. The spherical surface on the downstream outside of the flow turning valve member 72 achieves a 360 degree contact with the annular seat 13 to affect a closure of the valve.

The flow turning valve member 72 is suspended between the downstream seat 13 and the guide 76 within the first generally cylindrical body chamber 86. The guide 76 is positioned by the circumferential groove 84 in the bonnet 73. The bonnet 73 is attached to the body 10 by any of the means described hereinabove such as a threaded plug, a bolted flange and by means of the compression plate shown in FIGS. 11, 18 and 19. The drawings 12–14 and 16 and 17 show a bonnet seal (gasket or ring) 83 for pressure containment between the body 10 and the bonnet 73.

Any of the various spring configurations such as the belleville springs 15 used in FIGS. 1, 2 and 5 can be utilized to load the guide 76 in the same fashion as in FIGS. 1, 2 and 5, and the seat 13. Springs communicate with the seat 13, which seat in the preferred embodiment is removable, and the valve body 10, within the generally circumferential seat groove 85. Seat springs are often used with seal to body seals on trunnion-mounted valves which require the seat to body seal to move to seal the valve member which is generally fixed on the shaft axis and not able to move in response to pipe pressures as a floating ball member can. While this first preferred flow turning embodiment is not trunnion mounted, trunnion mounted types of body seat sealing, known widely in the art, can be used especially when bidirectional flow shut-off is a requirement of the piping arrangement.

Figure 12:
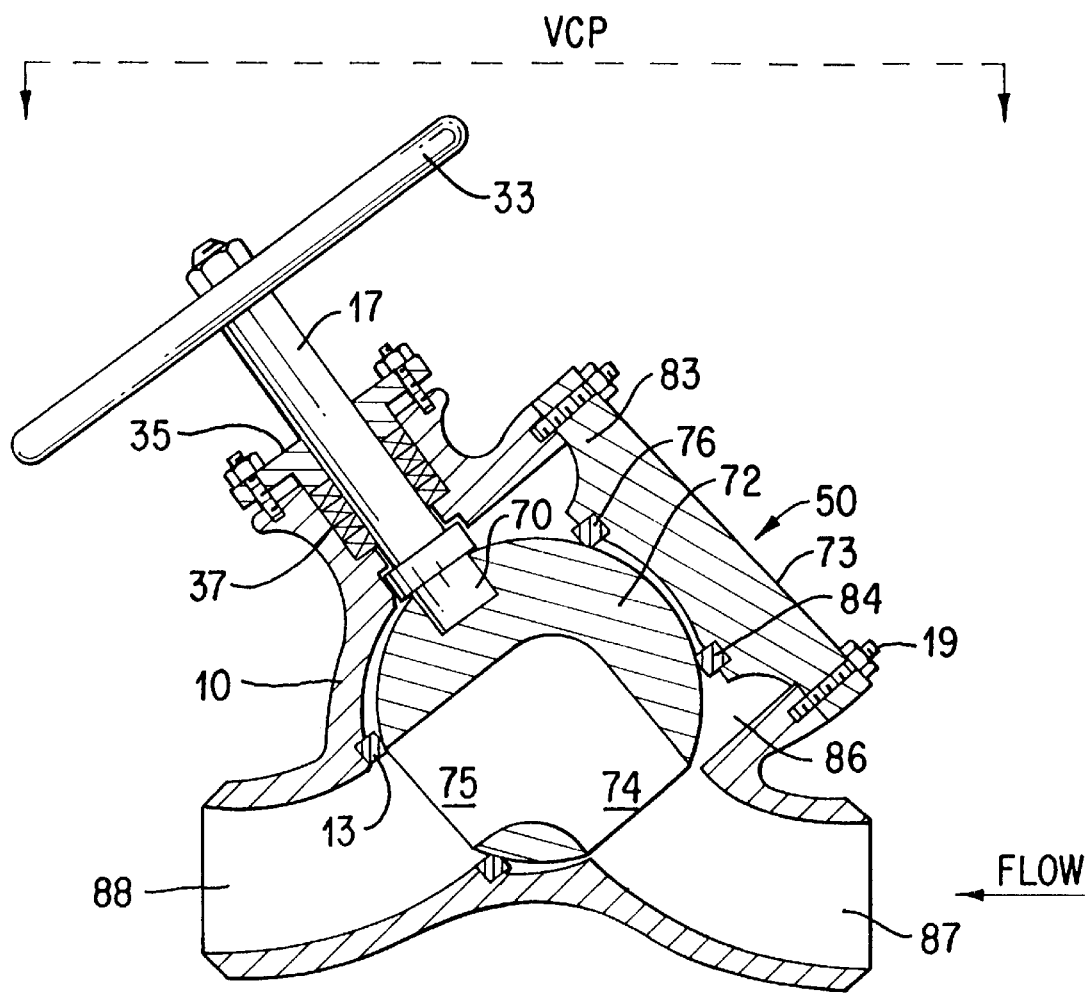
FIG. 12 is a cross sectional view of the main components of the first preferred embodiment of the straight pipe AERo valve in the open position.

The valve shown in FIG. 12 is the valve in FIG. 11, but in the open position. In this drawing the second flow turning member flow passageway 75 in the flow turning valve member 72 is positioned by means of the rotation of the valve stem 17, which generally shares the same axis as the first turning member flow passageway 74, and is inserted into the member slot 70 to be centered on the VCP. This position permits the fluid communication which the second generally cylindrical body passageway 88 which turns the flow to communicate with the pipe connection.

Figure 13:
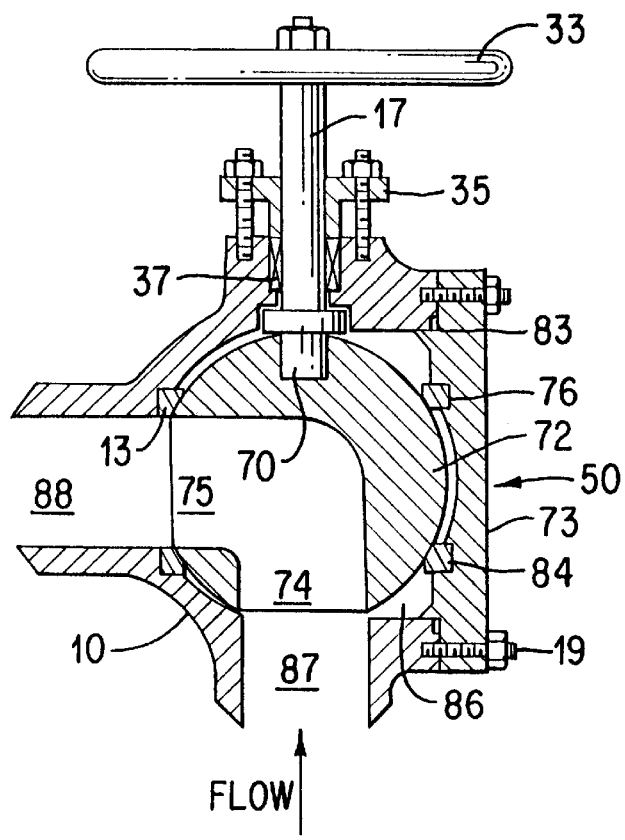
FIG. 13 is a cross sectional view of the main components of the first preferred embodiment of the turning pipe AERo valve in the open position with primary flow coming from under the valve.
Figure 14:
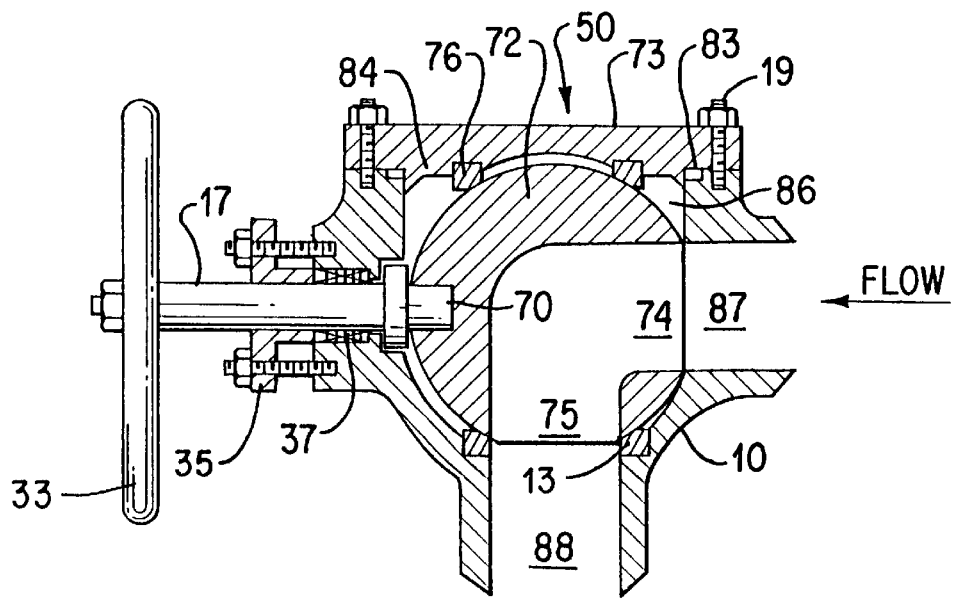
FIG. 14 is a cross sectional view of the main components of the first preferred embodiment of the turning pipe AERo valve in the open position with primary flow coming from the side of the valve.

FIGS. 13 and 14 show the first preferred flow turning embodiment in the elbow valve body embodiment. In FIG. 13 the primary flow direction of this floating ball design is from below the valve. This would provide for the best shut-off seal if the flow was moving up a vertical pipe to a connecting horizontal pipe. In FIG. 14 the primary flow direction is from a horizontal pipe to the vertical pipe. Note that the position of the actuator 33 and stem 17 changes when the seal 13 is situated on the downstream side of the primary flow direction. This permits the ball member 72 to move in the direction of flow to provide optimum mating seal with the seat 13. Note that these are the same valves that are positioned to have the seat downstream.

Figure 15:
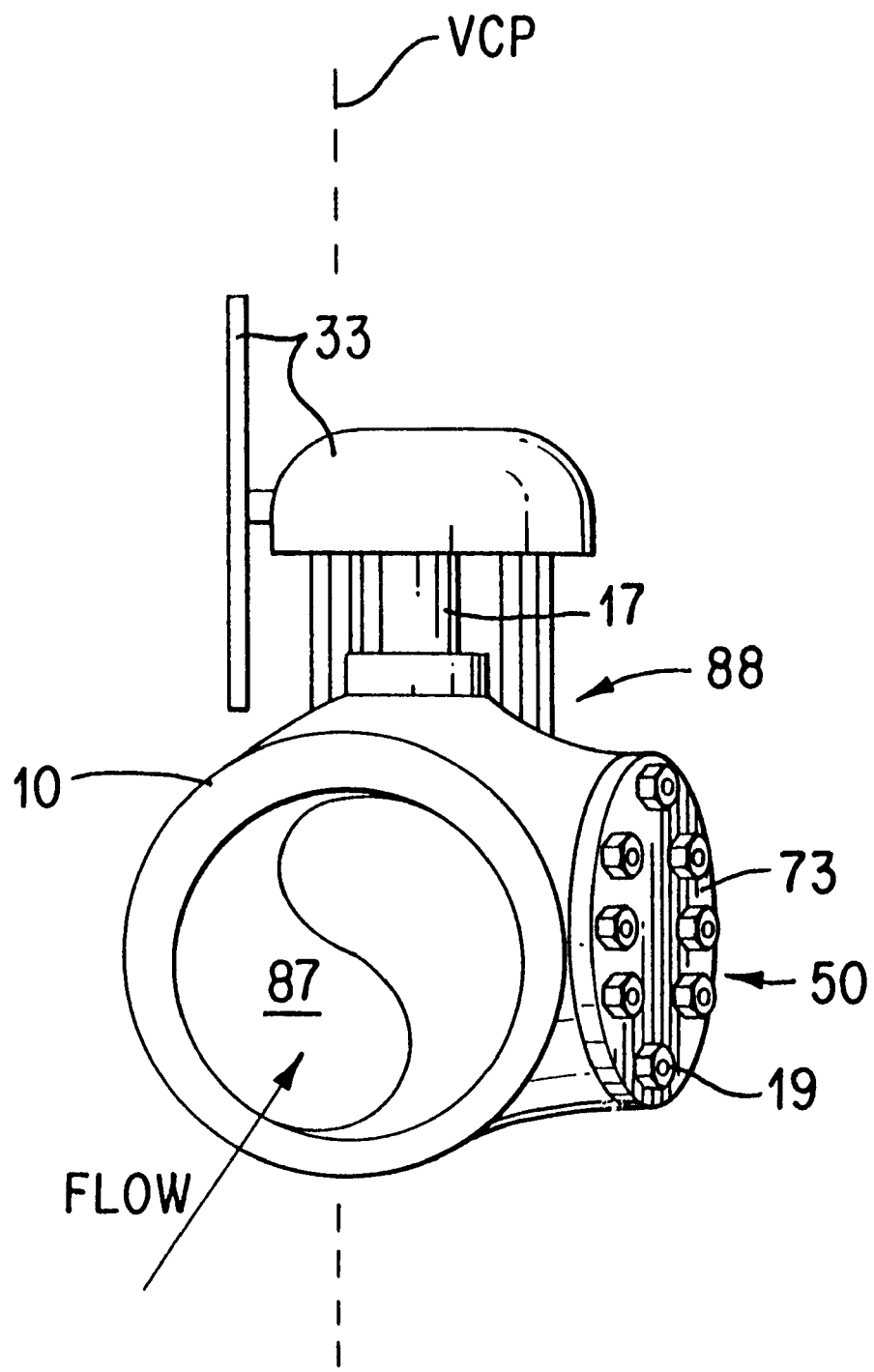
FIG. 15 is an elevational view of the second preferred embodiment of the straight pipe AERo valve which, due to the valve member configuration has its actuator and access port centered on on different vertical planes.
Figure 16:
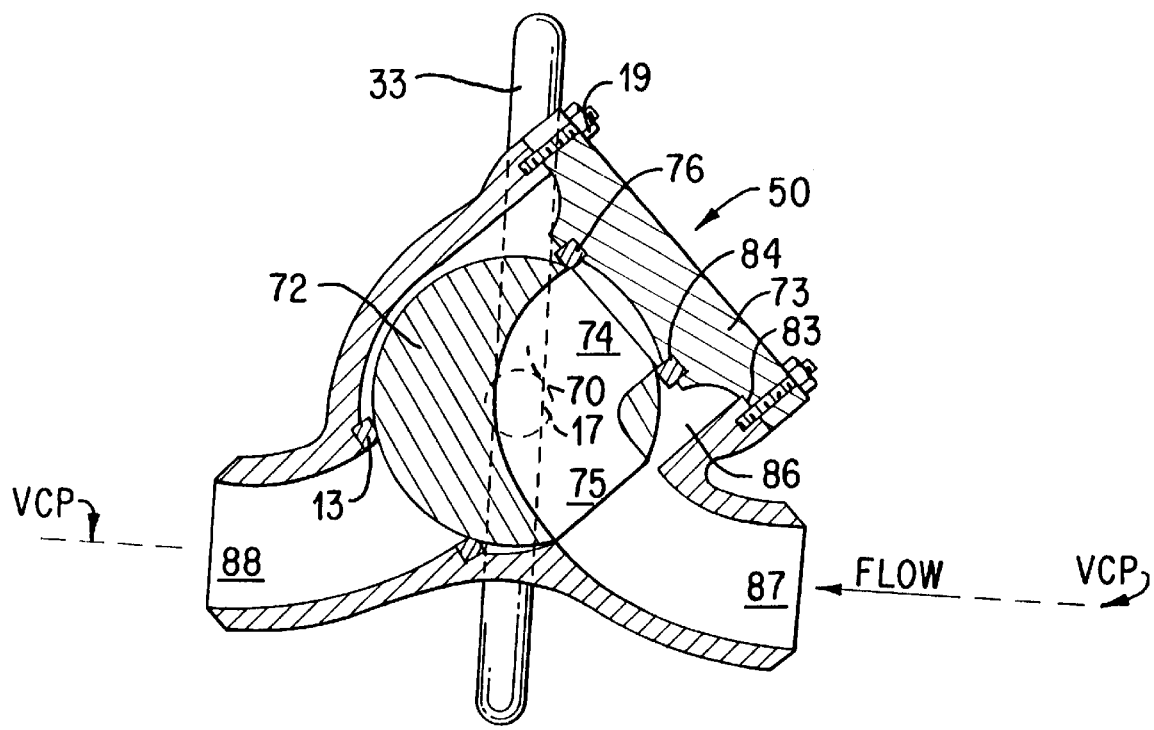
FIG. 16 is a top cross sectional view of the second preferred embodiment of the straight pipe AERo valve embodiment which has its actuator and access port centered on different planes.
Figure 17:
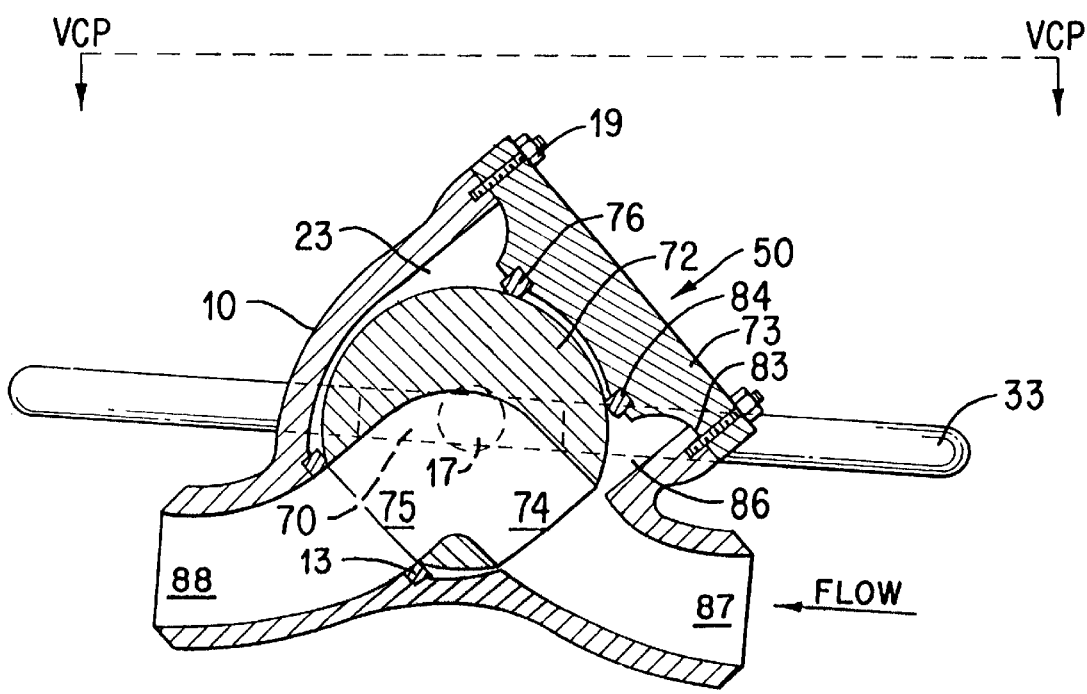
FIG. 17 is an elevational cross section view of the second preferred embodiment of the straight pipe AERo valve embodiment which has its actuator and access port on different planes.

The second preferred flow turning embodiments are shown in FIGS. 15–17. Referring to FIGS. 15 and 16, this flow turning embodiment differs from the first preferred embodiments described above in the way the flow passageway turns away from the VCP when the valve actuator stem 17 is centered on a plane parallel to the VCP. This turning away from the VCP causes the valve internal access port 50 to be centered on a different vertical plane from (the VCP) actuator stem 17. In previous AERo valve flow turning embodiments, the flow actuator stem and access port are along the same plane, regardless of valve installation position. FIG. 17 shows what happens when the valve's flow passageway centerline (87, 74, 75, 88) is the same as the VCP in this second preferred flow turning embodiment. The actuator stem 17 becomes perpendicular to the VCP. A valve of this type would appear to be mounted on its side in a horizontal pipe because the stem is also horizontal (perpendicular to the VCP).

The second flow turning embodiments can be a floating ball or a full or partial trunnion-mounted ball. It can be utilized in the straight pipe or elbow pipe body embodiment. When used in the latter body embodiment, positioning of the body so that the seal is downstream is the preferred installation. In floating ball embodiments, trunnion-mounted member embodiments generally have the flow past the seat to the member flow passageway. This is body orientation shown in FIGS. 13 and 14 in the first preferred flow turning embodiment.

To further understand the second preferred valve flow turning embodiment we shall refer to FIG. 17 which shows a generally cylindrical passageway 87 which turns the flow from the axis of the pipe to the first turning member flow passageway 74 in the member 72 with the valve in the full open position, housed within the valve body chamber 86. Next, the flow turns at the intersection of the first running member flow passageway 74 and the second turning member flow passageway 75 and proceeds from the latter passageway 75 past the seat 13 to the second fluid passageway 88 which turns the flow to the connecting pipe.

The location of user interfaces, i.e. the actuator 33 and the internal access port 50 on the second preferred flow turning embodiments can vary. FIGS. 15 and 16 show the same valve configuration whereas FIG. 17 shows a different configuration. FIGS. 16 and 17 look the same with the exception of the valve member positions. The difference in drawing "view" indicates that the location of the user interfaces on these two valves are clearly different. To further understand the positioning of the user interfaces a standard point of reference is hereby established as follows: the specified interface is located on the valve relative to the primary direction of flow. If an interface is on the right hand side of the valve looking in the direction of flow it is considered a right hand feature. Now looking at drawings 15 and 16 we learn that the interface selected for "handing" is the access port 50, and that the valve is therefore "right hand ported". Looking at FIG. 17 we see that the interface selected for "handing" is the actuator and we see that the valve is "right hand actuated". Note that the choice of one interface then determines the location of the second interface and that a planar perpendicularity exists between the two interfaces. As another example to further demonstrate this point, a valve of this embodiment which is left hand actuated means that the port is on top (or bottom) of the valve.

The assembly and maintenance procedure for the flow turning embodiments are modified from the earlier embodiments described above in that the seat 13 is not on the DVC but rather, in the body housing 86. The seat 13 inserted into the body groove 85, rather than weld overlaid or metal sprayed (integral to body) is the preferred embodiments of the flow turning. Like the downstream seat 13 above, (which is part of the DVC, which is removable), the preference for a removable seat is in keeping with the simplified maintenance procedures which is a key part of the AERo valve designs.

Figure 18:
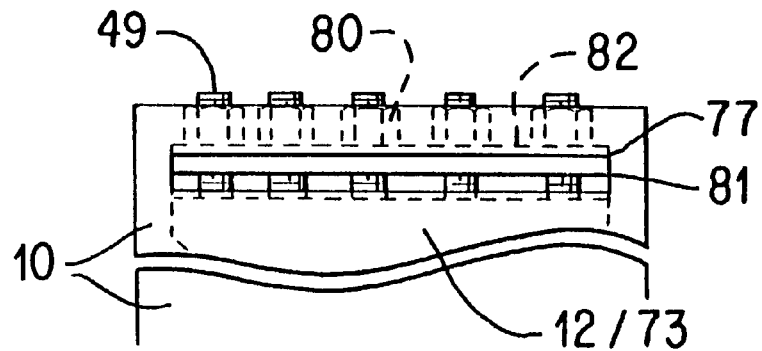
FIG. 18 is a top view of the valve body area that houses the compression plate means.
Figure 19:
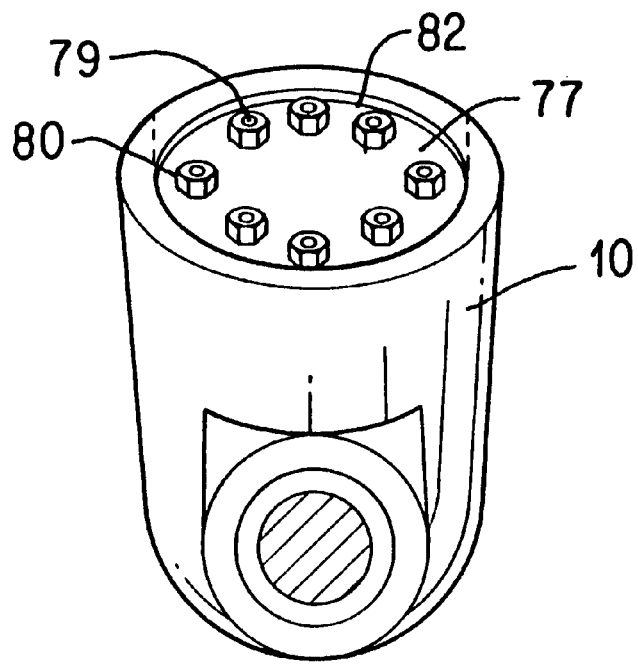
FIG. 19 is an end elevational view of the AERo valve with the compression plate means.

In addition to the flow turning embodiments, an additional means of retaining pressure and compressing internal parts at the valve internal access port 50 is shown in FIGS. 11, 18 and 19.

FIG. 11 shows a typical flow turning embodiment of the AERo valve with a compression plate means of pressure containment and internal parts positioning. This design can be used with the embodiments previously described, and with the flow turning embodiments of FIGS. 11–17. This would be done by substituting the outboard surface of the DVC 12 for the same surface on the bonnet 73.

The purpose of this embodiment, like the pressure seal design of FIG. 5, is to effect a positive seal of the body opening while reducing the overall size of this part of the valve.

Referring to FIG. 11, after the bonnet 73 is installed through the internal access port 50 and against the member 72 the compression plate 77 is placed into the body 10 by inserting it into the body chamber 86 through the body slot 81. Once the plate 77 is in the body chamber 86 the compression screws 79 are threaded into the threaded compression plate holes 78 until they contact the bonnet 73. Compression screws 79 may be of any number of designs, i.e. hex head bolts, socket head bolts as shown in FIG. 11, standard studs using a double nut arrangement to push the stud end communicating with the bonnet 73 or a special stud and nut where the studs have wrench flats on their compression plate end along with a nut 80 that is used to lock the stud into position after the bonnet 73 has been fully compressed to sealably mate with the body 10.

Turning down the compression screws 79 forces the compression plate 77 against the compression shoulder 82. The compression shoulder 82 acts to stop the movement of the plate and then to transfer the screw loading forces against the bonnet 73 or the DVC 12. In the preferred embodiment, the bonnet 73 and DVC 12 have a compression stop shoulder 89 which establishes the correct position of the bonnet to properly position the valve member, guides and properly compress internal seals.

SUMMARY OF THE INVENTION

Accordingly, the reader will see that the Angle Entry Rotary valve of this invention will retain the inherent advantages of side entry valve assembly, and, make inline valve repair possible. In ball valves this means that not only will be AERo valve be repairable in the pipeline, but, it can also be assembled with the valve seats and members being installed in the direction of compression, rather than from the top down as occurs in top entry ball valves. This will make assembly easier and all but eliminate the risk of damaging new parts when putting a valve back together.

Butterfly valves can now be fixed without disturbing connecting pipes.

Furthermore, the AERo valve has the additional advantages in that:

- during the course of routine repairs, the valve seat(s) is removed. This is extraordinary when considered in light of the fact that with linear operating valves like gate and globe valves, the seat removal is very rarely done, and if it is, substantial extra direct and indirect (downtime of plant equipment) costs are added to the job. Also, a worn out gate or globe valve seat often signals that the valve is scrap. This is not so with the AERo valve where the valve body could potentially, outlive several seat replacements.
- in the time it takes to unbolt and remove a valve out of the pipeline, it can be completely rebuilt, simply by changing out the complete set valve internals with a spare set. This means that a plant can get back into production within hours, rather than shifts, days or weeks.
- worker exposure to potentially hazardous conditions is reduced dramatically as repair time is greatly minimized. This is very important for chemical and nuclear power plants.

extensive valve seat restoration can take place since it is removed during routine repairs, and, the seat, due to the DVC's concentric design, can be easily machined in an engine lathe.

flanged valve pipe connections can be reduced in favor of welded connections. This would result in less flange leakage, thereby saving product that would be lost to the atmosphere, and maintenance cost associated with routine flange maintenance and emergency repairs.

valve flange leaks are a source of environmental contamination. Use of the AERo valve design and welding valve connections would enhance United States of America's Clean Air Act compliance, especially in the refining and chemical processing industries,where volatile organic compounds (VOCs) are a major concern.

Although the description above contains many details, these should not be construed as limiting the scope of this invention, and, should be considered as illustrative of the presently preferred embodiments of this invention. For example, the AERo valve body exterior can simply be a square or rectangular shape, etc., with some of the various flow passageways on a plane other than one radiating from the centerline of the pipe centerline (offset), etc.

Therefore, the scope of this invention should be determined by the attached claims and their legal equivalents, rather than by the examples given.

We claim:

1. A valve with a rotating member for use in controlling fluid flow in a pipeline having a fluid path from an upstream pipeline segment to a downstream pipeline segment, wherein said upstream pipeline segment and said downstream pipeline segment have flow axes which are not common, wherein said valve comprises:

an inlet flow passageway in fluid communication with said upstream pipeline segment, and wherein said inlet flow passageway has a flow axis generally coextensive with the flow axis of the upstream pipeline segment;

an outlet flow passageway in fluid communication with said downstream pipeline segment, and wherein said outlet flow passageway has a flow axis generally coextensive with the flow axis of the downstream pipeline segment;

a valve body intermediate said inlet flow passageway and said outlet flow passageway, said valve body comprising;

a chamber having an axis generally coextensive with said inlet flow passageway, and providing a housing for a rotating valve member and a removable valve body chamber component disposed therein;

a rotating valve member capable of fluid flow control;

a valve maintenance access port positioned at one end of said chamber, downstream of said rotating valve member and siad outlet flow passageway; and said removable valve body chamber component intermediate said valve member and said valve maintenance access port for sealingly engaging one end of said rotating valve member and the other end sealingly engaging a surface of said chamber adjacent said access port when fully inserted within said valve body chamber through said maintenance access port, comprising:

an inlet portion flow passageway having a flow axis generally coextensive with the flow axis of said upstream pipeline segment; and an outlet portion flow passageway having a flow axis generally coextensive with the flow axis of said downstream pipeline segment;

and wherein maintenance of said rotating valve member and said removable valve body chamber component can be effected by way of said maintenance access port.

2. The valve of claim 1 wherein said valve body further comprises a downstream valve seat and a means to apply assembly compression.

3. The valve of claim 1 wherein said removable valve body chamber component further comprises a downstream valve seat, a behind-the-seat seal, and means to apply assembly compression.

4. The valve of claim 1 wherein said valve body further comprises a downstream valve seat and a behind-the-seat seal for a butterfly valve.

5. The valve of claim 1 wherein said removable valve body chamber component further comprises a downstream valve seat and a behind-the seat seal for a butterfly valve.

6. The valve of claim 1 wherein the valve member is selected from the group comprising floating ball valves, trunnion-mounted ball valves with an upstream mounted seat, trunnion-mounted valves with a downstream seat, trunnion-mounted valves with upstream and downstream mounted seats, and butterfly valves.

7. The valve of claim 1 wherein a threaded, flanged, pressure sealed, or clamped means is employed to retain said valve maintenance access port.

8. The valve of claim 1 further comprising additional flow control elements.

9. the valve of claim 1 wherein said removable valve body chamber component is sealably mated to said maintenance access port, and acts as a pressure boundary cover.

10. The valve of claim 9 wherein said valve body further comprises a downstream valve seat and a means to apply assembly compression.

11. The valve of claim 9 wherein said removable valve body chamber component further comprises a downstream valve seat, a behind-the-seat seal, and means to apply assembly compression.

12. The valve of claim 9 wherein said valve body further comprises a downstream valve seat and a behind-the-seat seal for a butterfly valve.

13. The valve of claim 9 wherein said removable valve body chamber component further comprises a downstream valve seat and a behind-the-seat seal for a butterfly valve.

14. The valve of claim 9 wherein the valve member is selected from the group comprising floating ball valves, trunnion-mounted ball valves with an upstream mounted seat, trunnion-mounted valves with a downstream seat, trunnion-mounted valves with upstream and downstream mounted seats, and butterfly valves.

15. The valve of claim 9 wherein a threaded, flanged, pressure sealed, or clamped means is employed to retain said valve maintenance access port.

16. The valve of claim 9 further comprising additional flow control elements.

17. A valve with a rotating member for use in controlling fluid flow in a pipeline having a fluid flow path from an upstream pipeline segment to a downstream pipeline segment, wherein said upstream pipeline segment and said downstream pipeline segment have a common flow axis displaced by said valve, and wherein said valve comprises:

a inlet flow passageway in fluid communication with said upstream pipeline segment, and wherein said inlet flow passageway comprises:

an initial portion having a flow axis generally coextensive with the common flow axes of said upstream and downstream pipeline segments; and a final portion having a flow axis which forms an obtuse angle with the direction of fluid flow from the upstream pipeline segment to the downstream pipeline segment along the common flow axes of said upstream and downstream pipeline segments;

an outlet flow passageway in fluid communication with said downstream pipeline segment, and wherein said outlet flow passageway comprises:

an initial portion having a flow axis which forms an acute angle with the direction of fluid flow from the upstream pipeline segment to the downstream pipeline segment along the common flow axes of said upstream and downstream pipeline segments; and a final portion having a flow axis generally coextensive with the flow axes of said upstream and downstream pipeline segments; and a valve body intermediate said inlet flow passageway and said outlet flow passageway, said valve body comprising:

a chamber having an axis generally coextensive with said final portion of said inlet flow passageway, and providing a housing for a rotating valve member and a removable valve body chamber component disposed therein;

a rotating valve member capable of fluid flow control;

a valve maintenance access port positioned at one end of said chamber, downstream of said rotating valve member and said outlet flow passageway; and said removable valve body chamber component intermediate said rotating valve member and said valve maintenance access port for sealingly engaging one end of said rotating valve member and the other end sealingly engaging a surface of said chamber adjacent said access port when fully inserted within said valve body chamber through said maintenance access port, comprising;

an inlet portion flow passageway having a flow axis generally coextensive with the flow axis of said final portion of said inlet flow passageway; and an outlet portion flow passageway having a flow axis generally coextensive with the flow axis of said initial portion of said outlet flow passageway;

and wherein maintenance of said rotating valve member and said removable valve body chamber component can be effected by way of said maintenance access port.

18. The valve of claim 17 wherein said valve body further comprises a downstream valve seat and a means to apply assembly compression.

19. The valve of claim 17 wherein said removable valve body chamber component further comprises a downstream valve seat, a behind-the-seat seal, and means to apply assembly compression.

20. The valve of claim 17 wherein said valve body further comprises a downstream valve seat and a behind-the-seat seal for a butterfly valve.

21. The valve of claim 17 wherein said removable valve body chamber component further comprises a downstream valve seat and a behind-the-seat seal for a butterfly valve.

22. The valve of claim 17 wherein the valve member is selected from the group comprising floating ball valves, trunnion-mounted ball valves with an upstream mounted seat, trunnion-mounted valves with a downstream seat, trunnion-mounted valves with upstream and downstream mounted seats, and butterfly valves.

23. The valve of claim 17 wherein a threaded, flanged, pressure sealed, or clamped means is employed to retain said valve maintenance access port.

24. The valve of claim 17 further comprising additional flow control elements.

25. The valve of claim 17 wherein said removable valve body chamber component is sealably mated to said maintenance access port, and acts as a pressure boundary cover.

26. The valve of claim 25 wherein said valve body further comprises a downstream valve seat and a means to apply assembly compression.

27. The valve of claim 25 wherein said removable valve body chamber component further comprises a downstream valve seat, a behind-the-seat seal, and means to apply assembly compression.

28. The valve of claim 25 wherein said valve body further comprises a downstream valve seat and a behind-the-seat seal for a butterfly valve.

29. The valve of claim 25 wherein said removable valve body chamber component further comprises a downstream valve seat and a behind-the-seat seal for a butterfly valve.

30. The valve of claim 25 wherein the valve member is selected from a group comprising floating ball valves, trunnion-mounted ball valves with an upstream mounted seat, trunnion-mounted valves with a downstream seat, trunnion-mounted valves with upstream and downstream mounted seats, and butterfly valves.

31. The valve of claim 25 wherein a threaded, flanged, pressure sealed, or clamped means is employed to retain said valve maintenance access port.

32. The valve of claim 25 further comprising additional flow control elements.

33. A method of repairing a valve with a rotating member for use in controlling fluid flow in a pipeline having a fluid path from an upstream pipeline segment to a downstream pipeline segment, wherein said upstream pipeline segment and said downstream pipeline segment have flow axes which are not common, and wherein said valve comprises:

an inlet flow passageway in fluid communication with said upstream pipeline segment, and wherein said inlet flow passageway has a flow axis generally coextensive with the flow axis of the upstream pipeline segment;

an outlet flow passageway in fluid communication with said downstream pipeline segment, and wherein said outlet flow passageway has a flow axis generally coextensive with the flow axis of the downstream pipeline segment;

a valve body intermediate said inlet flow passageway and said outlet flow passageway, said valve body comprising:

a chamber having an axis generally coextensive with said inlet flow passageway, and providing a housing for a rotating valve member and a removable valve body chamber component disposed therein;

a rotating valve member capable of fluid flow control;

a valve maintenance access port positioned at one end of said chamber, downstream of said rotating valve member and said outlet flow passageway; and said removable valve body chamber component intermediate said valve member and said valve maintenance access port for sealingly engaging one end of said rotating valve member and the other end sealingly engaging a surface of said chamber adjacent said access port when fully inserted within said valve body chamber through said maintenance access port, comprising:

an inlet portion flow passageway having a flow axis generally coextensive with the flow axis of said upstream pipeline segment; and an outlet portion flow passageway having a flow axis generally coextensive with the flow axis of said downstream pipeline segment;

and wherein maintenance of said rotating valve member and said removable valve body chamber component can be effected by way of said maintenance access port, which method comprises:
  a. opening of said valve maintenance access port;
  b. removal of said removable valve body chamber component;
  c. inspection of said rotating valve member and said removable valve body chamber component;
  d. repair or replacement of said rotating valve member and said removable valve body chamber component, as necessary;
  e. realignment of said rotating valve member and replacement of a removable flow passageway component; and
  f. closing of said valve maintenance access port.

34. A method of repairing a valve with a rotating member for use in controlling fluid flow in a pipeline having a fluid flow path from an upstream pipeline segment to a downstream pipeline segment, wherein said upstream pipeline segment and said downstream pipeline segment have a common flow axis displaced by said valve, and wherein said valve comprises:

a inlet flow passageway in fluid communication with said upstream pipeline segment, and wherein said inlet flow passageway comprises:
    an initial portion having a flow axis generally coextensive with the common flow axes of said upstream and downstream pipeline segments; and
    a final portion having a flow axis which forms an obtuse angle with the direction of fluid flow from the upstream pipeline segment to the downstream pipeline segment along the common flow axes of said upstream and downstream pipeline segments;
  an outlet flow passageway in fluid communication with said downstream pipeline segment, and wherein said outlet flow passageway comprises:
    an initial portion having a flow axis which forms an acute angle with the direction of fluid flow from the upstream pipeline segment to the downstream pipeline segment along the common flow axes of said upstream and downstream pipeline segments; and
    a final portion having a flow axis generally coextensive with the flow axes of said upstream and downstream pipeline segments; and
  a valve body intermediate said inlet flow passageway and said outlet flow passageway, said valve body comprising:
    a chamber having an axis generally coextensive with said final portion of said inlet flow passageway, and providing a housing for a rotating valve member and a removable valve body chamber component disposed therein;
    a rotating valve member capable of fluid flow control;
    a valve maintenance access port positioned at one end of said chamber, downstream of said rotating valve member; and
    said removable valve body chamber component intermediate said rotating valve member and said valve maintenance access port for sealingly engaging one end of said rotating valve member and the other end sealingly engaging a surface of said chamber adjacent said access port when fully inserted within said valve body chamber through said maintenance access port, comprising:
      an inlet portion flow passageway having a flow axis generally coextensive with the flow axis of said final portion of said inlet flow passageway; and
      an outlet portion flow passageway having a flow axis generally coextensive with the flow axis of said initial portion of said outlet flow passageway;

and wherein maintenance of said rotating valve member and said removable valve body chamber component can be effected by way of said maintenance access port,
which method comprises:
  a. opening of said valve maintenance access port;
  b. removal of said removable valve body chamber component;
  c. inspection of said rotating valve member and said removable valve body chamber component;
  d. repair or replacement of said rotating valve member and said removable valve body chamber component, as necessary;
  e. realignment of said rotating valve member and replacement of a removable flow passageway component; and
  f. closing of said valve maintenance access port.

35. A removable valve body chamber component for use in a valve with a rotating member for use in controlling fluid flow in a pipeline having a fluid path from an upstream pipeline segment to a downstream pipeline segment, wherein said upstream pipeline segment and said downstream pipeline segment have flow axes which are not common, and wherein said valve comprises:
  an inlet flow passageway in fluid communication with said upstream pipeline segment, and wherein said inlet flow passageway has a flow axis generally coextensive with the flow axis of the upstream pipeline segment;
  an outlet flow passageway in fluid communication with said downstream pipeline segment, and wherein said outlet flow passageway has a flow axis generally coextensive with the flow axis of the downstream pipeline segment;
  a valve body intermediate said inlet flow passageway and said outlet flow passageway, said valve body comprising:
    a chamber having an axis generally coextensive with said inlet flow passageway, and providing a housing for a rotating valve member and a removable valve body chamber component disposed therein;
    a rotating valve member capable of fluid flow control;
    A valve maintenance access port positioned at one end of said chamber, downstream of said rotating valve member and said outlet flow passageway;
  and wherein said removable valve body chamber component is adapted to be positioned intermediate said rotating valve member and said valve maintenance access port and further wherein one end of said removable valve body chamber component is adapted for sealingly engaging said rotating valve member and the other end is adapted for sealingly engaging a surface of said chamber adjacent said access port when fully inserted within said valve body chamber through said maintenance access port,
  said removable valve body chamber component further comprising:
    an inlet portion flow passageway having a flow axis generally coextensive with the flow axis of said upstream pipeline segment; and
    an outlet portion flow passageway having a flow axis generally coextensive with the flow axis of said downstream pipeline segment;
and wherein maintenance of said rotating valve member and said removable valve body chamber component can be effected by way of said maintenance access port.

36. A removable valve body chamber component for use in a valve with a rotating member for use in controlling fluid flow in a pipeline having a fluid flow path from an upstream pipeline segment to a downstream pipeline segment, wherein said upstream pipeline segment and said downstream pipeline segment have a common flow axis displaced by said valve, and wherein said valve comprises:

an inlet flow passageway in fluid communication with said upstream pipeline segment, and wherein said inlet flow passageway comprises:

an initial portion having a flow axis generally coextensive with the common flow axes of said upstream and downstream pipeline segments; and a final portion having a flow axis which forms an obtuse angle with the direction of fluid flow from the upstream pipeline segment to the downstream pipeline segment along the common flow axes of said upstream and downstream pipeline segments;

an outlet flow passageway in fluid communication with said downstream pipeline segment, and wherein said outlet flow passageway comprises:

an initial portion having a flow axis which forms an acute angle with the direction of fluid flow from the upstream pipeline segment to the downstream pipeline segment along the common flow axes of said upstream and downstream pipeline segments; and a final portion having a flow axis generally coextensive with the flow axes of said upstream and downstream pipeline segments; and a valve body intermediate said inlet flow passageway and said outlet flow passageway, said valve body comprising:

a chamber having an axis generally coextensive with said final portion of said inlet flow passageway, and providing a housing for a rotating valve member and a removable valve body chamber component disposed therein;

a rotating valve member capable of fluid flow control;

A valve maintenance access port positioned at one end of said chamber, downstream of said rotating valve member and said outlet flow passageway;

and wherein said removable valve body chamber component is adapted to be positioned intermediate said rotating valve member and said valve maintenance access port and further wherein one end of said removable valve body chamber component is adapted for sealingly engaging said rotating valve member and the other end is adapted for sealingly engaging a surface of said chamber adjacent said access port when fully inserted within said valve body chamber through said maintenance access port, said removable valve body chamber component further comprising:

an inlet portion flow passageway having a flow axis generally coextensive with the flow axis of said final portion of said inlet flow passageway; and an outlet portion flow passageway having a flow axis generally coextensive with the flow axis of said initial portion of said outlet flow passageway;

and wherein maintenance of said rotating valve member and said removable valve body chamber component can be effected by way of said maintenance access port.

37. A valve with a rotating member for use in controlling fluid flow in a pipeline having a fluid path from an upstream pipeline segment to a downstream pipeline segment, wherein said upstream pipeline segment and said downstream pipeline segment have flow axes which are not common, wherein said valve comprises:

an inlet flow passageway in fluid communication with said upstream pipeline segment, and wherein said inlet flow passageway has a flow axis generally coextensive with the flow axis of the upstream pipeline segment;

an outlet flow passageway in fluid communication with said downstream pipeline segment, and wherein said outlet flow passageway has a flow axis generally coextensive with the flow axis of the downstream pipeline segment;

a valve body intermediate said inlet flow passageway and said outlet flow passageway, said valve body comprising:

a chamber providing a housing for a rotating valve member dispersed therein;

a valve maintenance access port in said valve body at a position removed from said inlet flow passageway and said outlet flow passageway; and said rotating valve member capable of fluid flow control intermediate said inlet flow passageway and said outlet flow passageway and provided with means for sealingly engaging said outlet flow passageway and comprising:

an inlet portion flow passageway having a first position in which its flow axis is generally coextensive with the flow axis of said upstream pipeline segment; and an outlet portion flow passageway having a first position in which its flow axis is generally coextensive with the flow axis of said downstream pipeline segment and which outlet portion flow passageway communicates with said inlet portion flow passageway; and means for rotating said rotating valve member between a first position in which said inlet portion flow passageway communicates with said inlet flow passageway and said outlet portion flow passageway communicates with said outlet flow passageway, and a second position in which at least one of said inlet portion flow passageway and said outlet portion flow passageway is not in communication with said inlet flow passageway or said outlet flow passageway, respectively;

and wherein maintenance of said rotating valve member can be effected by way of said maintenance access port.

38. The valve of claim 37 wherein the valve member is selected from the group comprising floating ball valves, and full and partial (segmented) trunnion-mounted ball valves.

39. The valve of claim 37 wherein a threaded, flanged, pressure sealed, clamped or compression plate means is employed to retain said valve maintenance access port.

40. The valve of claim 37 further comprising additional flow control elements.

41. The valve of claim 37 wherein the centerline of said access port and the centerline of said means for rotating said rotating valve member are generally co-planar.

42. The valve of claim 37 wherein the centerline of said access port and the centerline of said means for rotating said rotating valve member are generally perpendicular.

43. A valve with a rotating member for use in controlling fluid flow in a pipeline having a fluid flow path from an upstream pipeline segment to a downstream pipeline segment, wherein said upstream pipeline segment and said downstream pipeline segment have a common flow axis displaced by said valve, and wherein said valve comprises:

a inlet flow passageway in fluid communication with said upstream pipeline segment, and wherein said inlet flow passageway comprises:

An initial portion having a flow axis generally coextensive with the common flow axes of said upstream and downstream pipeline segments; and A final portion having a flow axis which forms an obtuse angle with the direction of fluid flow from the upstream pipeline segment to the downstream pipeline segment along the common flow axes of said upstream and downstream pipeline segments;

an outlet flow passageway in fluid communication with said downstream pipeline segment, and wherein said outlet flow passageway comprises:

an initial portion having a flow axis which forms an acute angle with the direction of fluid flow from the upstream pipeline segment to the downstream pipeline segment along the common flow axes of said upstream and downstream pipeline segments; and a final portion having a flow axis generally coextensive with the flow axes of said upstream and downstream pipeline segments; and a valve body intermediate said inlet flow passageway and said outlet flow passageway, said valve body comprising:

a chamber providing a housing for a rotating valve member disposed therein;

A valve maintenance access port in said valve body at a position removed from said inlet flow passageway and said outlet flow passageway;

said rotating valve member capable of fluid flow control intermediate said inlet flow passageway and said outlet flow passageway and provided with means for sealingly engaging said inlet flow passageway and means for sealingly engaging said maintenance access port when fully inserted within said chamber through said maintenance access port, and comprising:

an inlet portion flow passageway having a first position in which its flow axis is generally coextensive with the flow axis of said final portion of said inlet flow passageway; and an outlet portion flow passageway having a first position in which its flow axis is generally coextensive with the flow axis of said initial portion of said outlet flow passageway; and means for rotating said rotating valve member between a first position in which said inlet portion flow passageway communicates with said inlet flow passageway and said outlet portion flow passageway communicates with said outlet flow passageway, and a second position in which at least one of said inlet portion flow passageway and said outlet portion flow passageway is not in communication with said inlet flow passageway or said outlet flow passageway, respectively;

and wherein maintenance of said rotating valve member can be effected by way of said maintenance access port.

44. The valve of claim 43 wherein said valve body further comprises a downstream valve seat and a means to apply assembly compression.

45. The valve of claim 43 wherein the valve member is selected from the group comprising floating ball valves, and full and partial (segmented) trunnion-mounted ball valves.

46. The valve of claim 43 wherein a threaded, flanged, pressure sealed, clamped or compression plate means is employed to retain said valve maintenance access port.

47. The valve of claim 43 further comprising additional flow control elements.

48. The valve of claim 43 wherein the centerline of said access port and the centerline of said means for rotating said rotating valve member are generally co-planar.

49. The valve of claim 43 wherein said means of rotation is not on the same vertical plane as the vertical centerline plane of a horizontal pipe in which a valve whose means of rotation is on top center of valve relative to the horizontal pipe.

50. A method of repairing a valve with a rotating member for use in controlling fluid flow in a pipeline having a fluid path from an upstream pipeline segment to a downstream pipeline segment, wherein said upstream pipeline segment and said downstream pipeline segment have flow axes which are not common, and wherein said valve comprises:

an inlet flow passageway in fluid communication with said upstream pipeline segment, and wherein said inlet flow passageway has a flow axis generally coextensive with the flow axis of the upstream pipeline segment;

an outlet flow passageway in fluid communication with said downstream pipeline segment, and wherein said outlet flow passageway has a flow axis generally coextensive with the flow axis of the downstream pipeline segment;

a valve body intermediate said inlet flow passageway and said outlet flow passageway, said valve body comprising:

a chamber providing a housing for a rotating valve member disposed therein;

a valve maintenance access port in said valve body at a position removed from said inlet flow passageway and said outlet flow passageway; and said rotating valve member capable of fluid flow control intermediate said inlet flow passageway and said outlet flow passageway and provided with means for sealingly engaging said outlet flow passageway and comprising:

an inlet portion flow passageway having a first position in which its flow axis is generally coextensive with the flow axis of said upstream pipeline segment; and an outlet portion flow passageway having a first position in which its flow axis is generally coextensive with the flow axis of said downstream pipeline segment and which outlet portion flow passageway communicates with said inlet portion flow passageway; and;

means for rotating said rotating valve member between a first position in which said inlet portion flow passageway communicates with said inlet flow passageway and said outlet portion flow passageway communicates with said outlet flow passageway, and a second position in which at least one of said inlet portion flow passageway and said outlet portion flow passageway is not in communication with said inlet flow passageway or said outlet flow passageway, respectively;

and wherein maintenance of said rotating valve member can be effected by way of said maintenance access port, which method comprises:
a. opening of said valve maintenance access port;
b. inspection of said rotating valve member;
c. repair or replacement of said rotating valve member as necessary;
d. realignment of said rotating valve member, as necessary; and
e. closing of said valve maintenance access port.

51. A method of repairing a valve with a rotating member for use in controlling fluid flow in a pipeline having a fluid flow path from an upstream pipeline segment to a downstream pipeline segment, wherein said upstream pipeline segment and said downstream pipeline segment have a common flow axis displaced by said valve, and wherein said valve comprises:

a inlet flow passageway in fluid communication with said upstream pipeline segment, and wherein said inlet flow passageway comprises:

an initial portion having a flow axis generally coextensive with the common flow axes of said upstream and downstream pipeline segments; and a final portion having a flow axis which forms an obtuse angle with the direction of fluid flow from the upstream pipeline segment to the downstream pipeline segment along the common flow axes of said upstream and downstream pipeline segments;

an outlet flow passageway in fluid communication with said downstream pipeline segment, and wherein said outlet flow passageway comprises:

an initial portion having a flow axis which forms an acute angle with the direction of fluid flow from the upstream pipeline segment to the downstream pipeline segment along the common flow axes of said upstream and downstream pipeline segments; and a final portion having a flow axis generally coextensive with the flow axes of said upstream and downstream pipeline segments; and a valve body intermediate said inlet flow passageway and said outlet flow passageway, said valve body comprising:

a chamber providing a housing for a rotating valve member disposed therein;

a valve maintenance access port in said valve body at a position removed from said inlet flow passageway and said outlet flow passageway; and said rotating valve member capable of fluid flow control intermediate said inlet flow passageway and said outlet flow passageway and provided with means for sealingly engaging said inlet flow passageway and means for sealingly engaging said maintenance access port when fully inserted within said chamber through said maintenance access port, and comprising:

an inlet portion flow passageway having a first position in which its flow axis is generally coextensive with the flow axis of said final portion of said inlet flow passageway; and an outlet portion flow passageway having a first position in which its flow axis is generally coextensive with the flow axis of said initial portion of said outlet flow passageway and which outlet portion flow passageway communicates with said inlet portion flow passageway; and;

means for rotating said rotating valve member between a first position in which said inlet portion flow passageway communicates with said inlet flow passageway and said outlet portion flow passageway communicates with said outlet flow passageway, and a second position in which at least one of said inlet portion flow passageway and said outlet portion flow passageway is not in communication with said inlet flow passageway or said outlet flow passageway, respectively;

and wherein maintenance of said rotating valve member can be effected by way of said maintenance access port, which method comprises:
a. opening of said valve maintenance access port;
b. inspection of said rotating valve member;
c. repair or replacement of said rotating valve member as necessary;
d. realignment of said rotating valve member, as necessary; and
e. closing of said valve maintenance access port.

52. A closure means for an internal access port of a valve, providing retaining pressure and compressing internal components in a valve environment, which closure means comprises:

(a) a valve body comprising:
(i) an internal access port;
(ii) a circumferential compression shoulder surrounding said internal access port;
(iii) a body slot in the form of a circumferential groove in the inner wall of said valve body inward of said compression shoulder, and wherein at least a portion of said groove comprises an opening through the side wall of said valve body inward of said compressive shoulder;

(b) at least one internal component requiring compressive loading in use, which may be accessed through said access port;

(c) A bonnet of suitable dimension for placement within said valve body by means of said access port, and for transmitting compressive forces against said at least one internal component;

(d) a compression plate having a dimension intermediate between said access port and said body slot, and suitable for positioning within said valve body through said body slot, said compression plate further provided with at least one threaded hole therethrough; and (e) at least one compression screw, suitable for engaging said at least one threaded hole through said compression plate and applying compressive force against said bonnet while sealing said compression plate against said compression shoulder of said valve body.

53. A closure means for an internal access port of a valve, providing retaining pressure and compressing internal components in a valve environment, which closure means comprises:

(a) a valve body comprising:
(i) an internal access port;
(ii) a circumferential compression shoulder surrounding said internal access port;
(iii) a body slot in the form of a circumferential groove in the inner wall of said valve body inward of said compression shoulder, and wherein at least a portion of said groove comprises an opening through the side wall of said valve body inward of said compressive shoulder;

(b) at least one internal component requiring compressive loading in use, which may be accessed through said access port;

(c) A removable valve body chamber component of suitable dimension for placement within said valve body by means of said access port, and for transmitting compressive forces against said at least one internal component;

(d) a compression plate having a dimension intermediate between said access port and said body slot, and suitable for positioning within said valve body through said body slot, said compression plate further provided with at least one threaded hole therethrough; and (e) at least one compression screw, suitable for engaging said at least one threaded hole through said compression plate and applying compressive force against said removable valve body chamber component while sealing said compression plate against said compression shoulder of said valve body.

* * * * *